March 20, 1951 J. H. VOSS 2,546,080

RELAY AUTOMATIC TELEPHONE SYSTEM

Filed July 1, 1948 18 Sheets-Sheet 1

INVENTOR.
JOHN H. VOSS

BY Chas. W. Candy

ATTORNEY

INVENTOR.
JOHN H. VOSS

BY Chas. L. Cardy

ATTORNEY

March 20, 1951 J. H. VOSS 2,546,080

RELAY AUTOMATIC TELEPHONE SYSTEM

Filed July 1, 1948 18 Sheets-Sheet 3

INVENTOR.
JOHN H. VOSS

BY [signature]

ATTORNEY

INVENTOR.
JOHN H. VOSS
BY Chas. W. Candy
ATTORNEY

RELAY AUTOMATIC TELEPHONE SYSTEM

Filed July 1, 1948 18 Sheets-Sheet 5

INVENTOR.

JOHN H. VOSS

BY Chas. W. Candy

ATTORNEY

RELAY AUTOMATIC TELEPHONE SYSTEM

Filed July 1, 1948 18 Sheets-Sheet 6

INVENTOR.
JOHN H. VOSS

BY Chas. W. Candy

ATTORNEY

March 20, 1951 J. H. VOSS 2,546,080

RELAY AUTOMATIC TELEPHONE SYSTEM

Filed July 1, 1948 18 Sheets-Sheet 7

INVENTOR.
JOHN H. VOSS

BY

ATTORNEY

March 20, 1951 J. H. VOSS 2,546,080

RELAY AUTOMATIC TELEPHONE SYSTEM

Filed July 1, 1948 18 Sheets-Sheet 8

INVENTOR.
JOHN H. VOSS

BY Chas. Lee Cardy

ATTORNEY

March 20, 1951 J. H. VOSS 2,546,080

RELAY AUTOMATIC TELEPHONE SYSTEM

Filed July 1, 1948 18 Sheets-Sheet 9

INVENTOR.
JOHN H. VOSS

BY Chas. W. Candy

ATTORNEY

March 20, 1951 J. H. VOSS 2,546,080

RELAY AUTOMATIC TELEPHONE SYSTEM

Filed July 1, 1948 18 Sheets-Sheet 10

INVENTOR.
JOHN H. VOSS.

BY [signature]

ATTORNEY

March 20, 1951 J. H. VOSS 2,546,080

RELAY AUTOMATIC TELEPHONE SYSTEM

Filed July 1, 1948 18 Sheets-Sheet 11

INVENTOR.

JOHN H. VOSS

BY Chas. W. Candy

ATTORNEY

INVENTOR.
JOHN H. VOSS
BY
[signature]
ATTORNEY

March 20, 1951 J. H. VOSS 2,546,080

RELAY AUTOMATIC TELEPHONE SYSTEM

Filed July 1, 1948 18 Sheets-Sheet 13

*INVENTOR.*

JOHN H. VOSS

*BY* [signature]

ATTORNEY

RELAY AUTOMATIC TELEPHONE SYSTEM

Filed July 1, 1948 18 Sheets-Sheet 14

INVENTOR.
JOHN H. VOSS

BY Chas. [signature]

ATTORNEY

INVENTOR.
JOHN H. VOSS

BY

ATTORNEY

March 20, 1951 J. H. VOSS 2,546,080

RELAY AUTOMATIC TELEPHONE SYSTEM

Filed July 1, 1948 18 Sheets-Sheet 16

INVENTOR.
JOHN H. VOSS

BY *Chas. L. Candy*

ATTORNEY

RELAY AUTOMATIC TELEPHONE SYSTEM

Filed July 1, 1948 18 Sheets-Sheet 17

INVENTOR.
JOHN H. VOSS
BY
[signature]
ATTORNEY

March 20, 1951 J. H. VOSS 2,546,080

RELAY AUTOMATIC TELEPHONE SYSTEM

Filed July 1, 1948 18 Sheets-Sheet 18

INVENTOR.
JOHN H. VOSS

BY

[signature]

ATTORNEY

Patented Mar. 20, 1951

2,546,080

UNITED STATES PATENT OFFICE 2,546,080

RELAY AUTOMATIC TELEPHONE SYSTEM

John H. Voss, Rochester, N. Y., assignor to Automatic Electric Laboratories, Inc., Chicago, Ill., a corporation of Delaware Application July 1, 1948, Serial No. 36,312

10 Claims. (Cl. 179—18)

This invention relates in general to automatic telephone systems and particularly to automatic systems of the all-relay type generally similar to those disclosed in Patent 2,491,291 issued to J. H. Voss et al. on December 13, 1949, and in my co-pending joint application Serial No. 720,756, filed January 8, 1946, now Patent No. 2,535,764 issued December 26, 1950, and is directed especially to improvements in the handling of large trunk groups, along the lines previously disclosed in my co-pending application Serial No. 790,728 filed December 10, 1947.

In the foregoing patent and applications various arrangements were disclosed for directing calls to preselected idle trunks in trunk groups of ten trunks or less, by means of trunk selecting relays external to the selectors or connectors employed, the units relays in these switches being controlled from the trunk selecting relays on a call to one of said trunk groups. In the foregoing last named application, a method was disclosed for putting a large group of trunks having a common single-digit call number, on two or more tens relays, and then controlling these relays, as well as the units relays, from the associated group of trunk select relays, on all calls to such trunk group.

The main object of the present invention is to provide greater flexibility and economy for the trunk selecting arrangement utilized in connection with the last named co-pending application S. N. 790,728.

The main feature of the present invention is accordingly the connection of the excess trunks from several large trunk groups to a single tens relay, and the operation of this relay, when required, from any of the various groups of trunk select relays associated with these trunk groups. In the stated prior application, the different pairs or sets of tens relays involved, were separately controlled from separate groups of trunk select relays. This prevented the full utilization of the contacts, except where round numbers of trunks, such as twenty or thirty, were involved. The arrangement of the present invention is much more suitable where trunk groups of intermediate sizes are employed, and permits a better use of tens relays, especially in a selector, where spare contacts cannot be used for subscribers lines, as they can in a connector system.

Another feature of the invention consists in improvements in the switch circuits for handling ground return lines.

Figure 19:
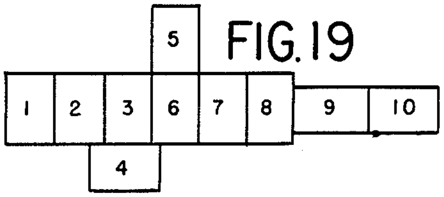
Figure 20:
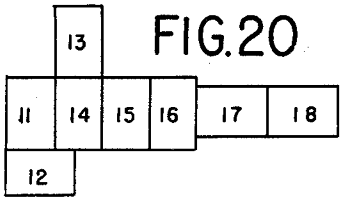

Other objects and features of the invention will be apparent from the description and claims which follow, when considered in conjunction with the appended drawings, comprising Figures 1 to 18 inclusive, which, when arranged side by side in the manner indicated in Figures 19 and 20, show the invention applied to both a connector and a selector system. In each case only enough equipment is illustrated to enable the operation to be described and understood.

Figure 3:
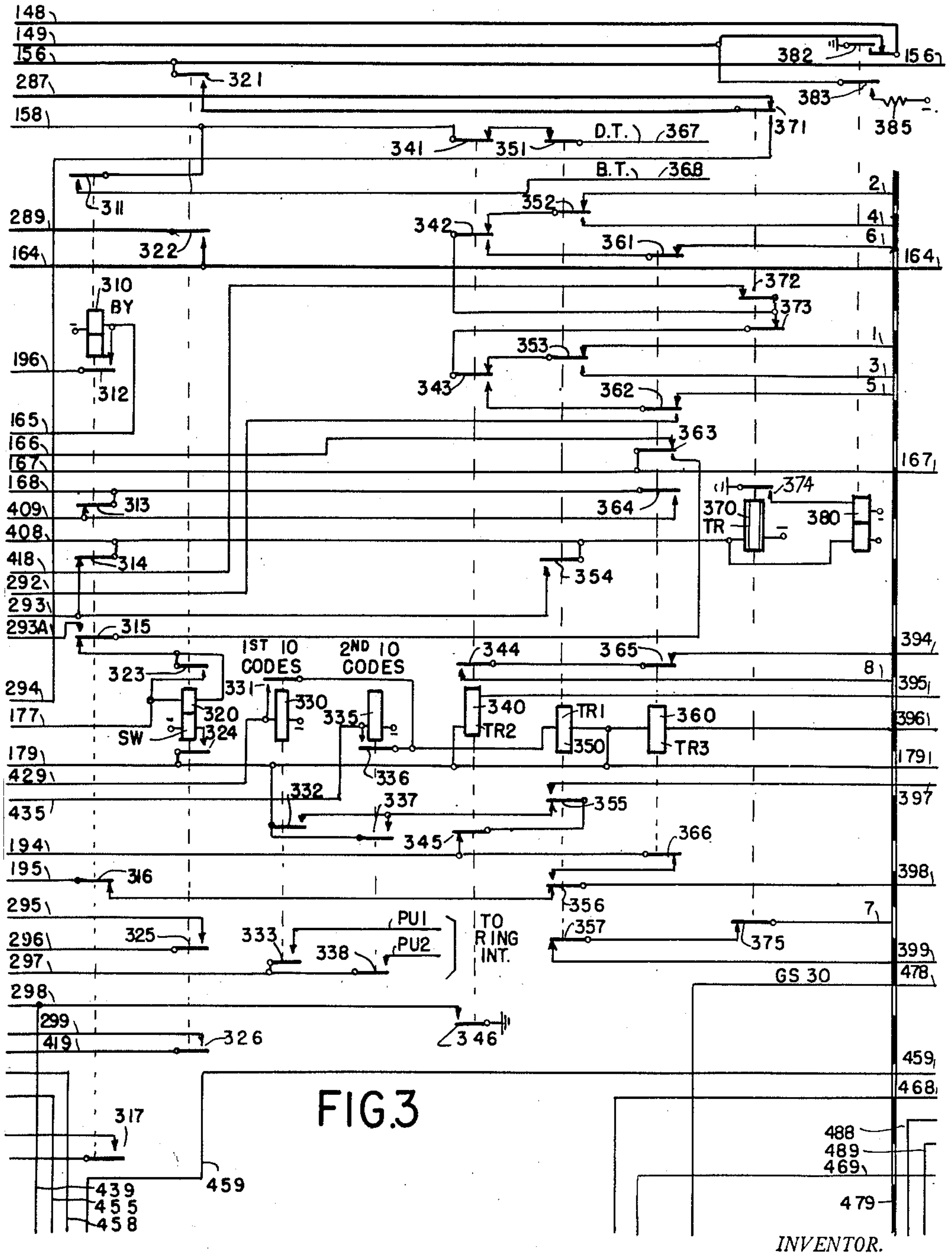
Figure 4:
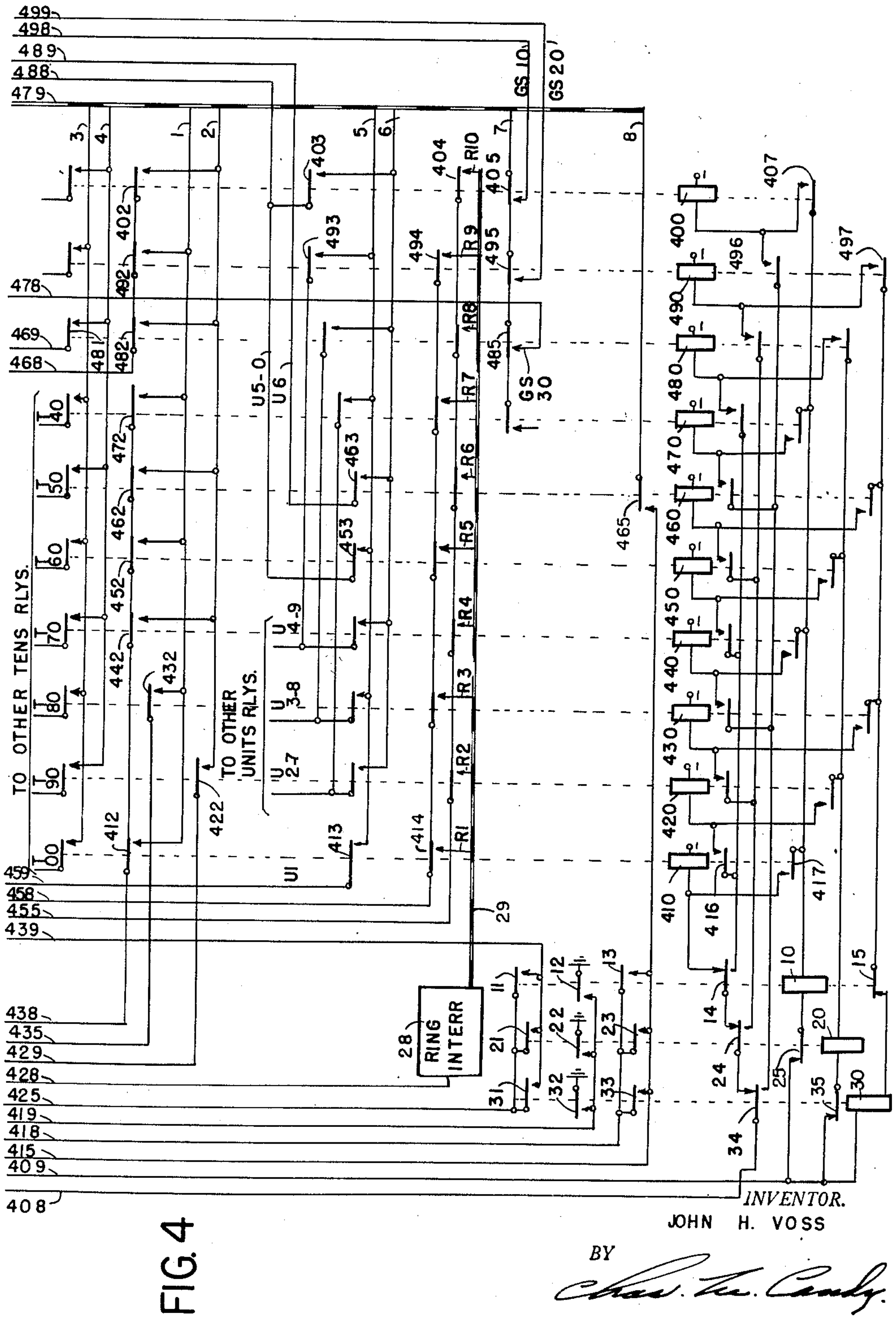
Figure 5:
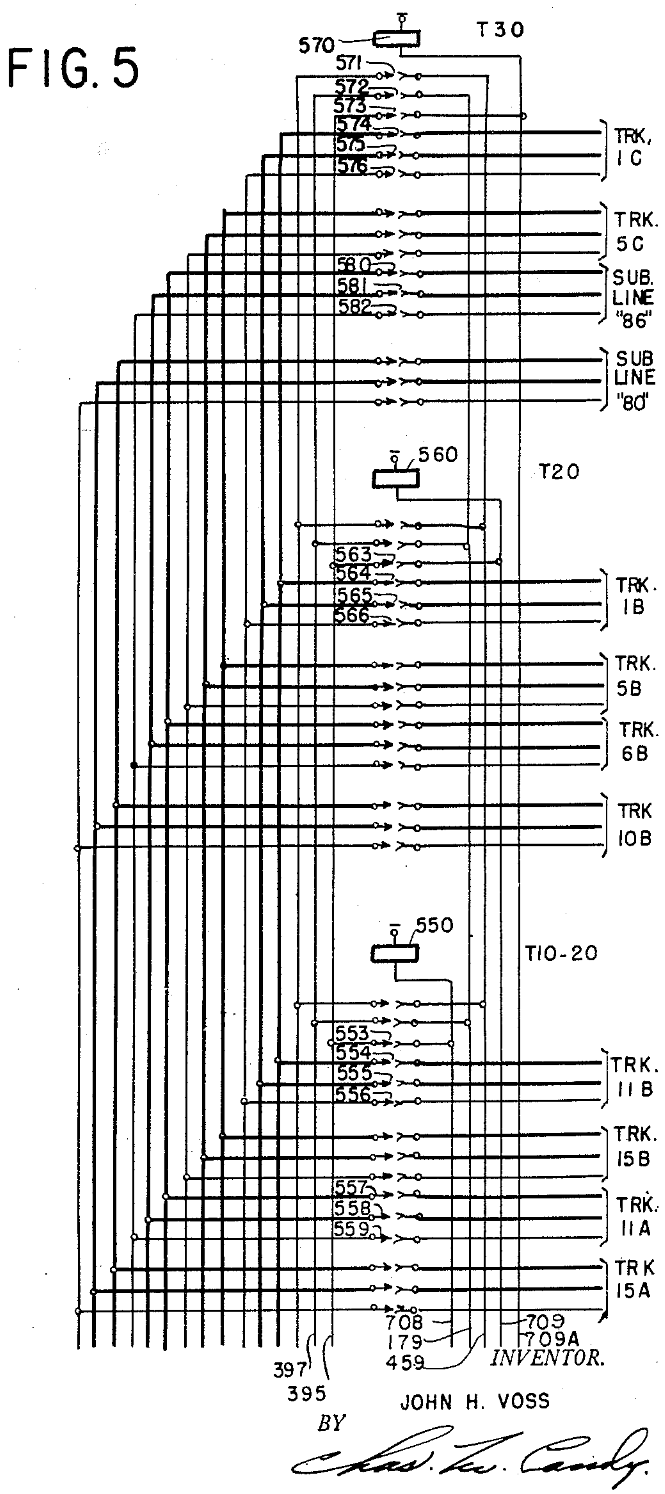
Figure 6:
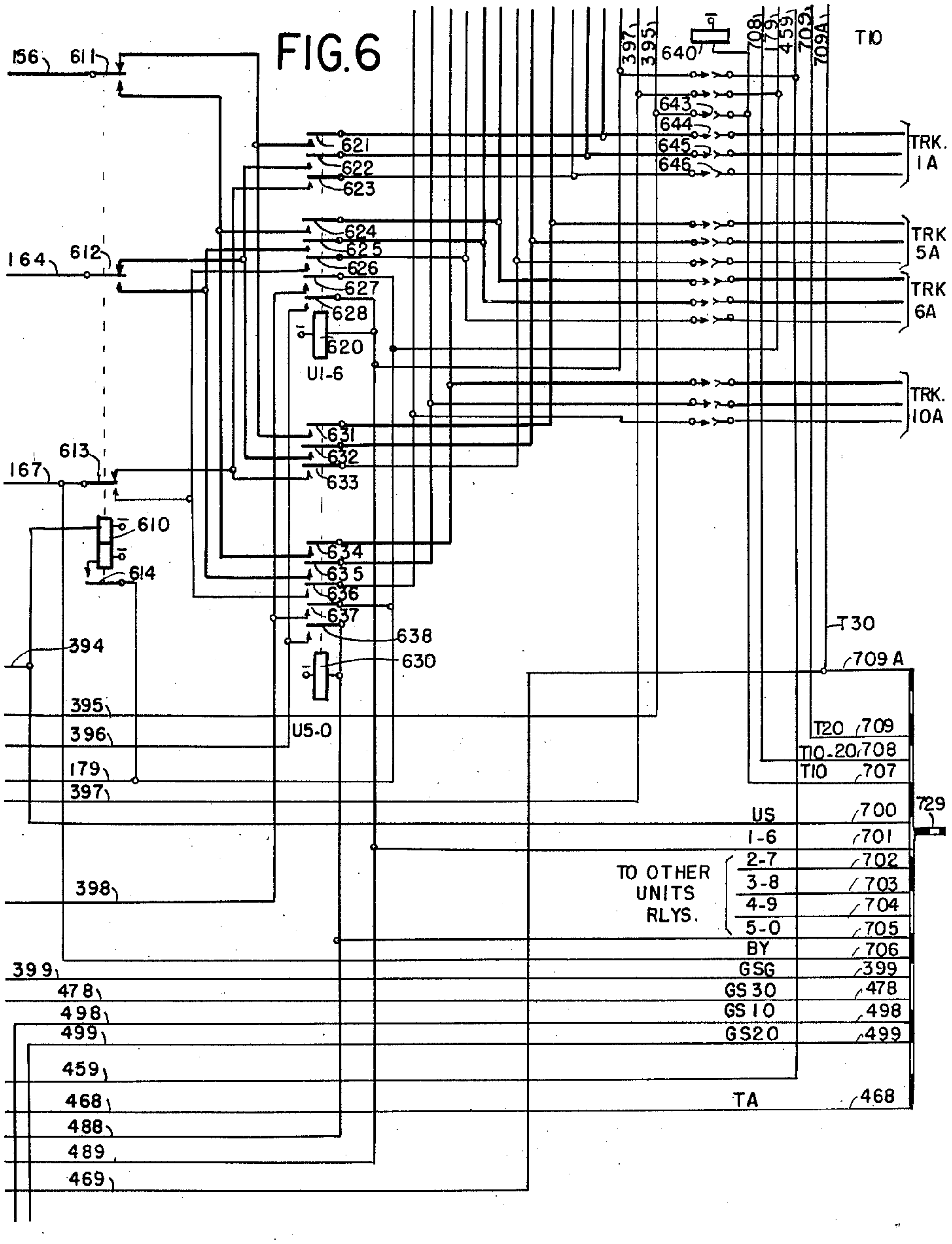

Thus Figures 1 to 6 inclusive, show a 100-line, all-relay, code-ringing connector, of a type suitable for use with both ground-return and all-metallic lines, including 20-station party lines, in a small 100-line community exchange, but with certain non-essential timing and restrictive features omitted, in order to simplify the drawings, while Figures 7 to 10 show the trunk selecting equipment required for handling two 15-trunk trunk groups connected to the contacts of three of the tens relays of this connector, in the manner indicated in Figures 5 and 6.

Figure 11:
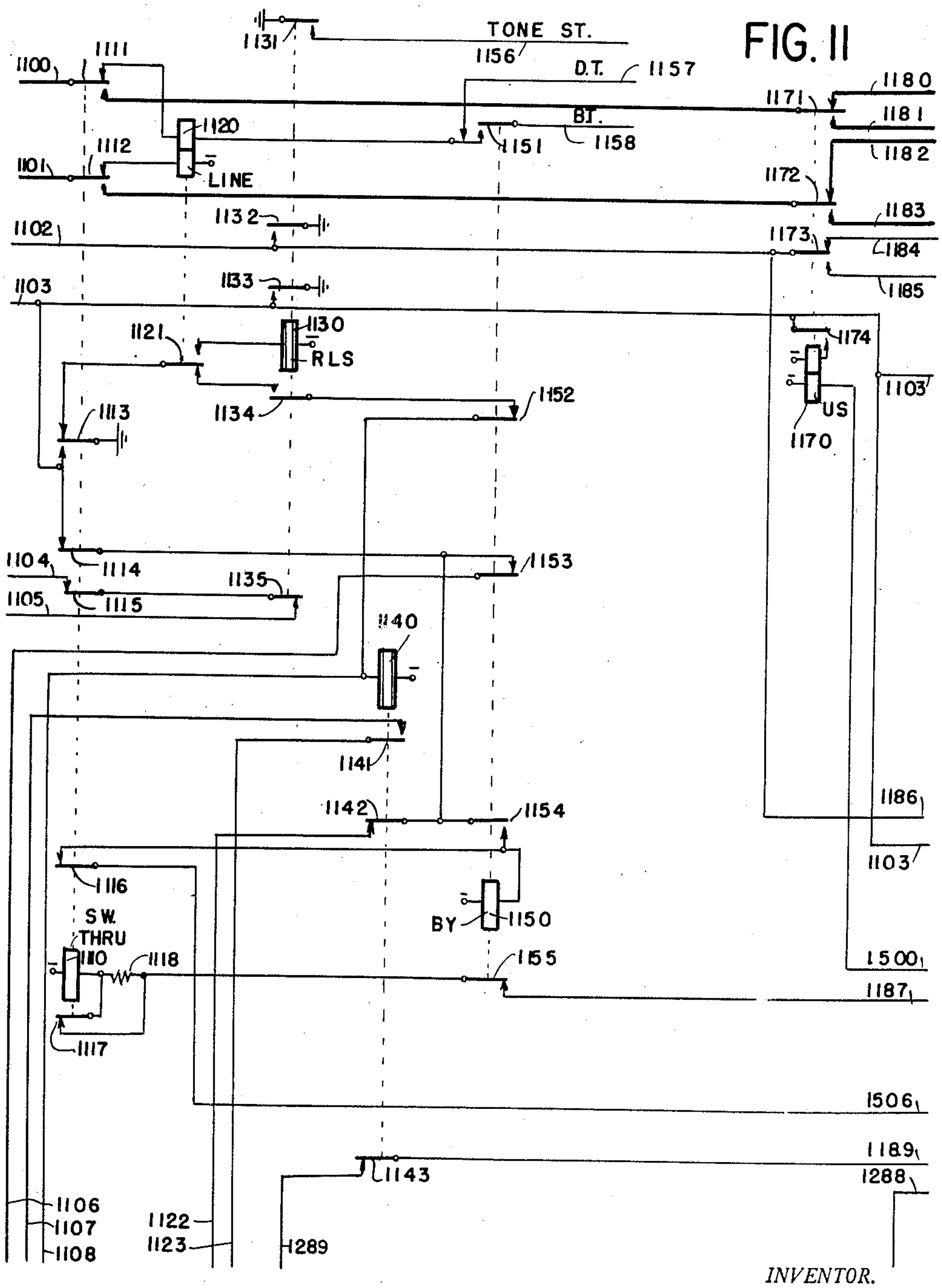
Figure 12:
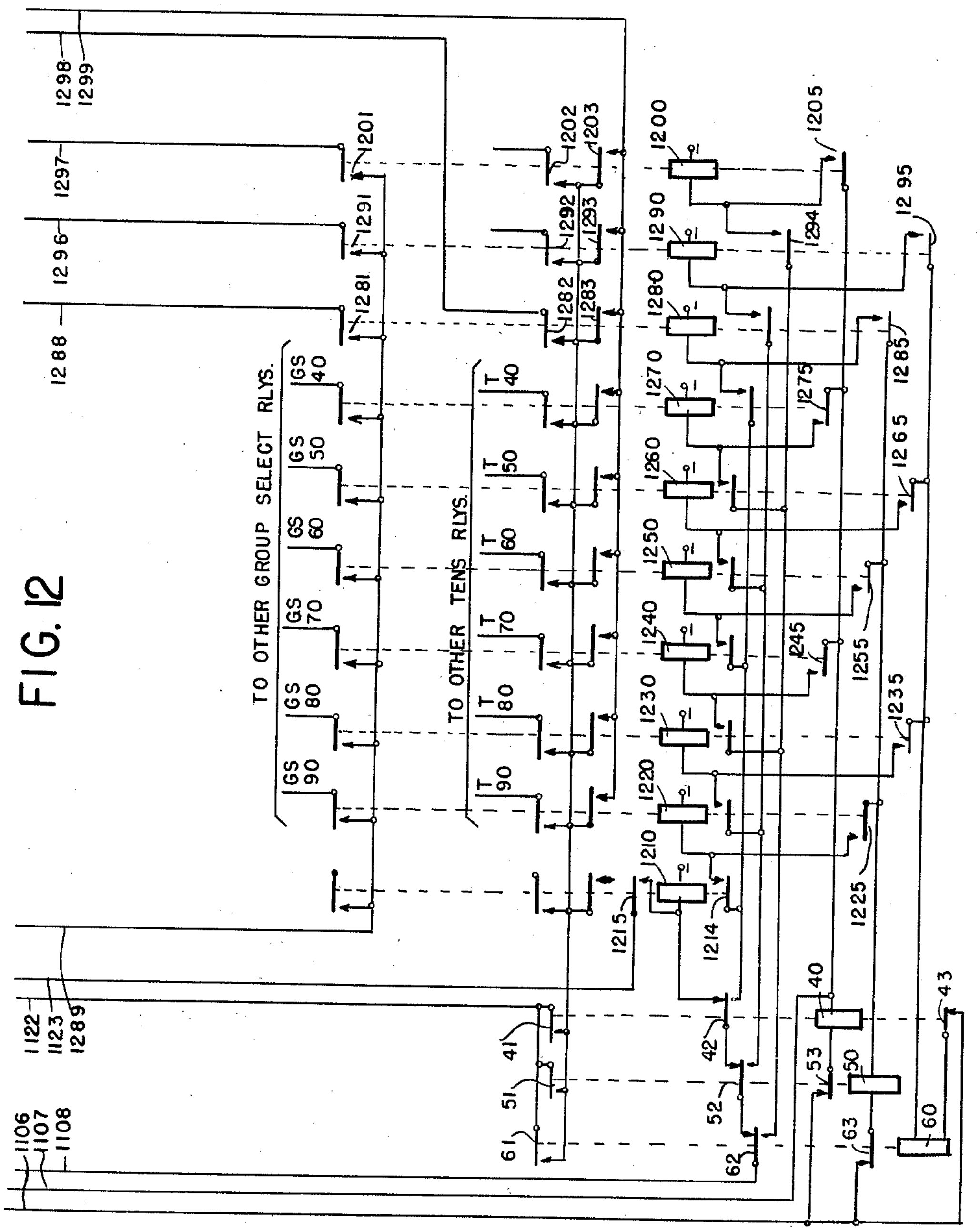
Figure 13:
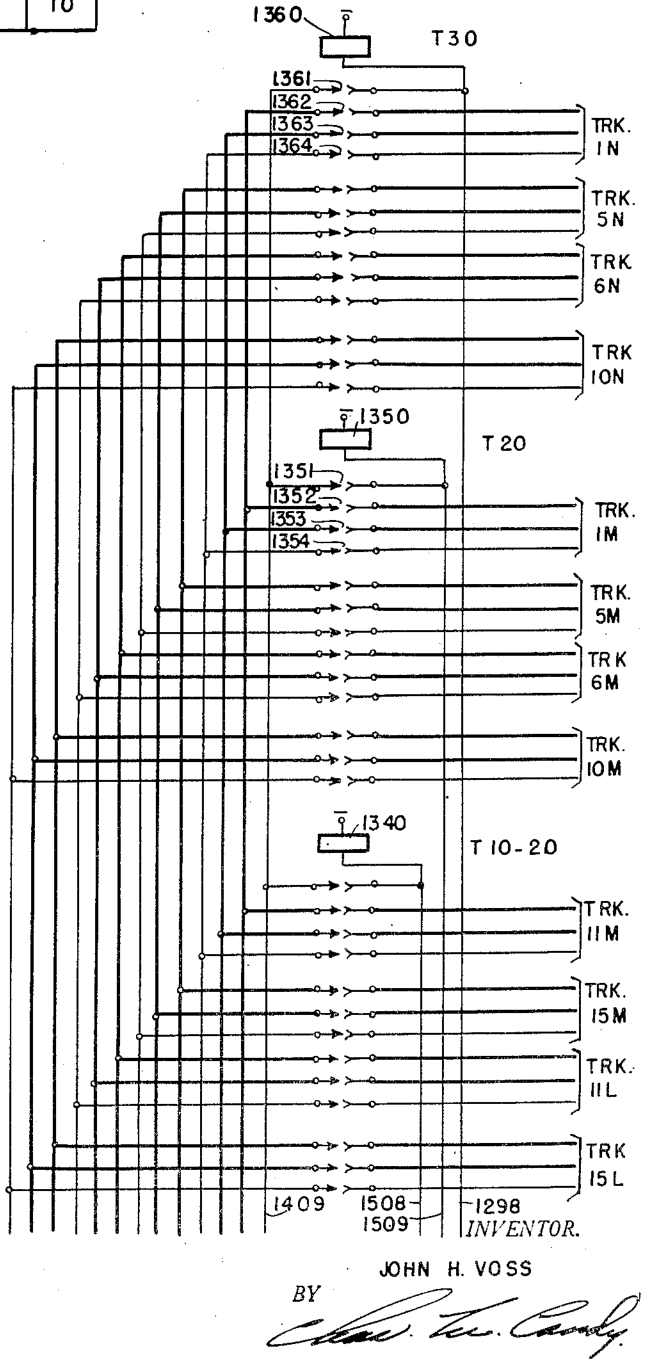
Figure 14:
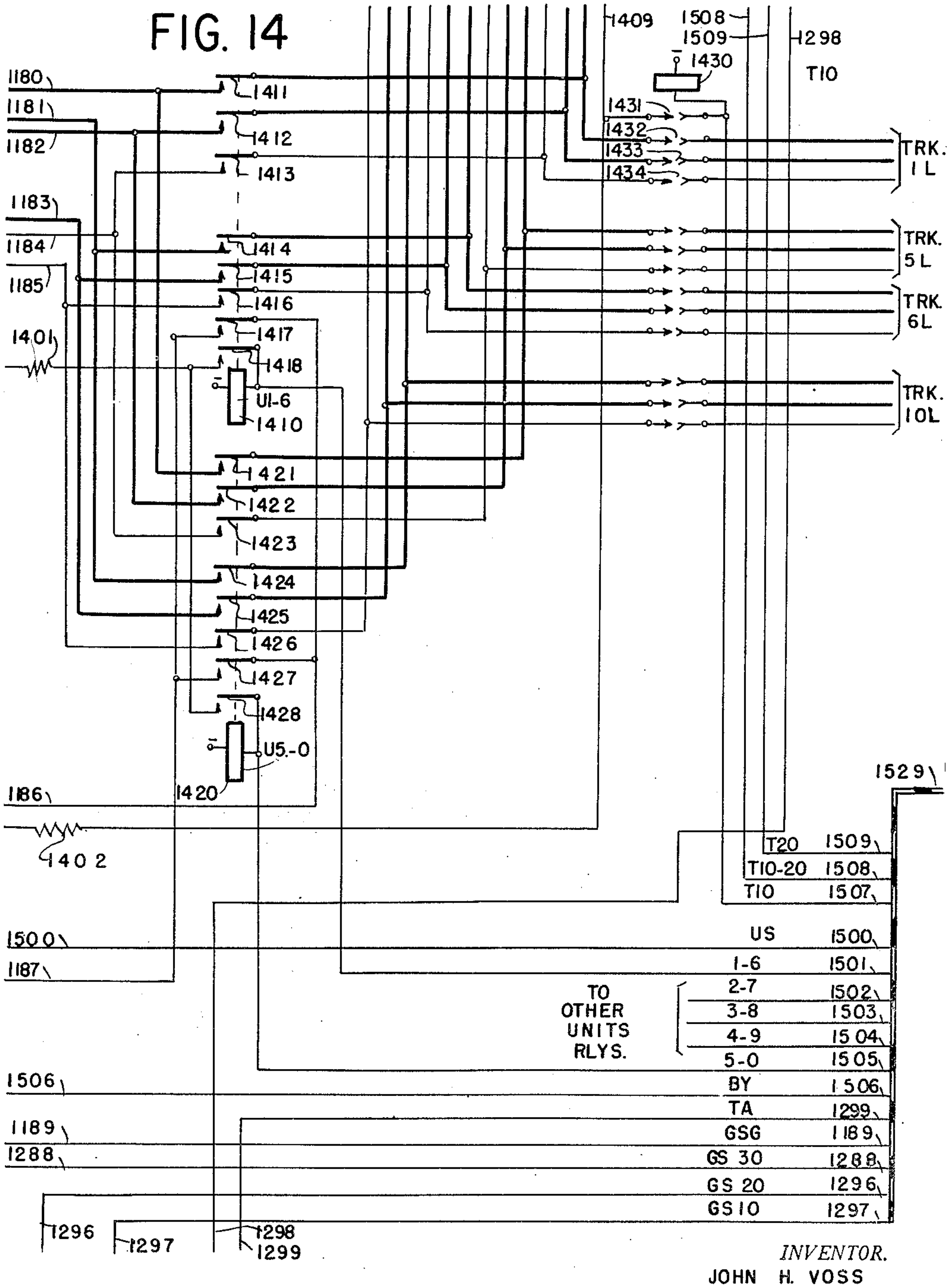

Likewise Figures 11 to 14 show a similarly simplified all-relay selector, suitable for use in larger systems, while Figures 15 to 18 show trunk selecting equipment for handling two 15-trunk trunk groups associated with three of the tens or group relays of this selector, in the manner indicated in Figures 13 and 14.

It should be understood of course, that many other arrangements of large trunk groups are possible with this system, both as to the number of trunk groups, the number of trunks in each trunk group, and the number of tens relays involved. Thus in the present instance, two groups of 11 and 19 trunks respectively, or 14 and 16 trunks or the like could have been used, instead of two groups of 15. It is also possible to control an almost limitless number of tens relays with only ten single-digit call numbers. In a selector for example, if it should be desired to have only large trunk groups, 10 trunk groups of 11 trunks each could be placed on 11 tens relays, 10 groups of 12 trunks each on 12 tens relays, 10 groups of 13 trunks each on 13 tens relays, etc. Groups of more than 20 trunks can also be accommodated just as readily, in many and various combinations, both symmetrical and unsymmetrical.

Figure 1:
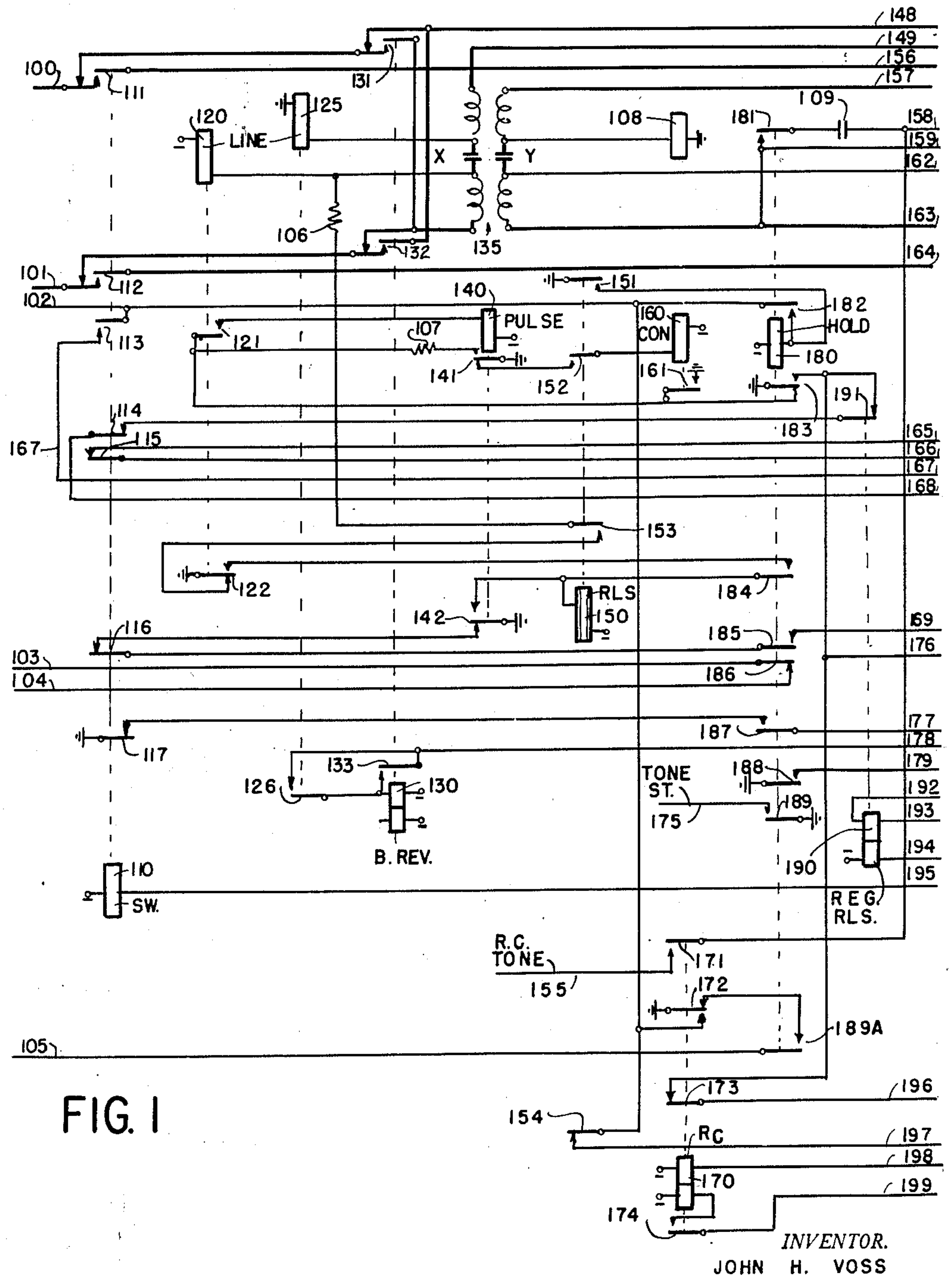

With further reference to the drawings, Figure 1 shows the incoming end of the 100 line connector, which may be assumed to be connected to an all-relay linefinder such as shown for example, in the previously mentioned application Serial No. 720,756. The conductors 100 and 101 on the left of this figure are the "talking" conductors, over which the connector is seized, 102 is the "test" conductor, 103 and 104 are the "link-busying" conductors. and 105 is the hold conductor. Also included in this figure are a repeating coil 135, a battery feed coil 106, and ten relays numbered 110 to 190 inclusive. Of these last, relay 110 is a "switch-through" relay, 120 and 125 are two "line" relays, 130 is a "battery-reversing" relay, 140 is a "pulsing" relay, 150 is a "release" relay, 160 is a "pulse control" relay, 170 is a "reverting call" relay, 180 is a "hold" relay, and 190 is a "register release" relay.

Figure 2:
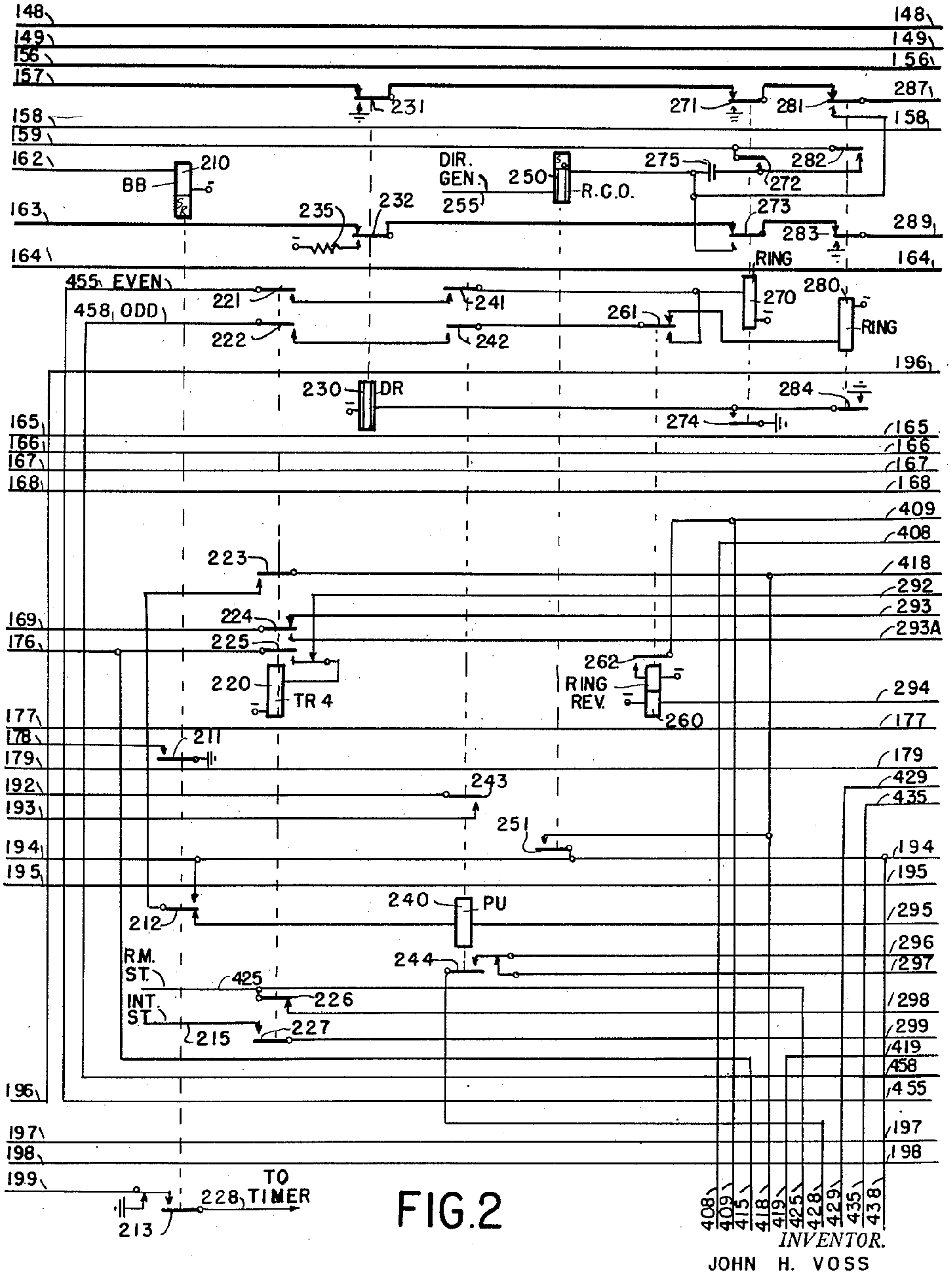

Figure 2 shows eight additional control relays for this connector, numbered 210 to 280 inclusive. Relay 210 is a "back-bridge" relay, 220 is a "ringing-digit transfer" relay, 230 is a "drain" relay, 240 is a "ringing pick-up" relay, 250 is a "ring cut-off" relay, 260 is a "ring reversing" relay, and relays 270 and 280 are "ringing" relays, the first of which rings to the negative side of a called line, and the second to the positive side.

Figure 3 shows nine more miscellaneous control relays for this connector, numbered 310 to 380, of which relay 310 is a "busy" relay, 320 is a "switching" relay, 330 and 335 are "code group selecting" relays, 340, 350 and 360 are "digit transfer" relays, and 370 and 380 are "dialling transfer" relays.

Figure 4 shows the connector digit register consisting of ten "counting" relays numbered 410 to 400 inclusive arranged in a well known form of counting chain, with three "counting control" relays on the left numbered 10, 20 and 30 for extending the local pulsing circuit to the different counting relays in turn as required. On the left side of this figure a ringing interrupter, the details of the construction of which are immaterial from the viewpoint of the invention, is indicated by the rectangle 28.

Figure 5 shows three of the tens relays employed in this connector, numbered 550, 560 and 570, while Figure 6 shows another tens relay numbered 640, two units relays numbered 620 and 630, and a "units switching" relay 610. In practice, five units relays are employed, each controlling two sets of line contacts each comprising two pair of line conductor contacts and one pair of test conductor contacts. Each tens relay is similarly provided with ten sets of line contacts, although only four sets, comprising the 1st, 5th, 6th and 10th are shown on each relay in the drawings. It may also be noted that three trunk groups "A," "B" and "C" are connected to the line contacts of the four tens relays shown. Trunk group "A" is a 15 trunk group, of which the first ten trunks are connected to tens relay 640 and the last five to the 6th to 10th contact sets of tens relay 550; trunk group "B" is also a 15 trunk group, of which the first ten trunks are connected to tens relay 560 and the last five to contact sets 1 to 5 of relay 550; and trunk group "C" is a simple group of five trunks all connected to contacts on tens relay 570, merely to show how small trunk groups may be mixed with large groups in the same switch. The remaining contacts of relay 570 are assumed to be connected to subscribers' lines.

Figure 7:
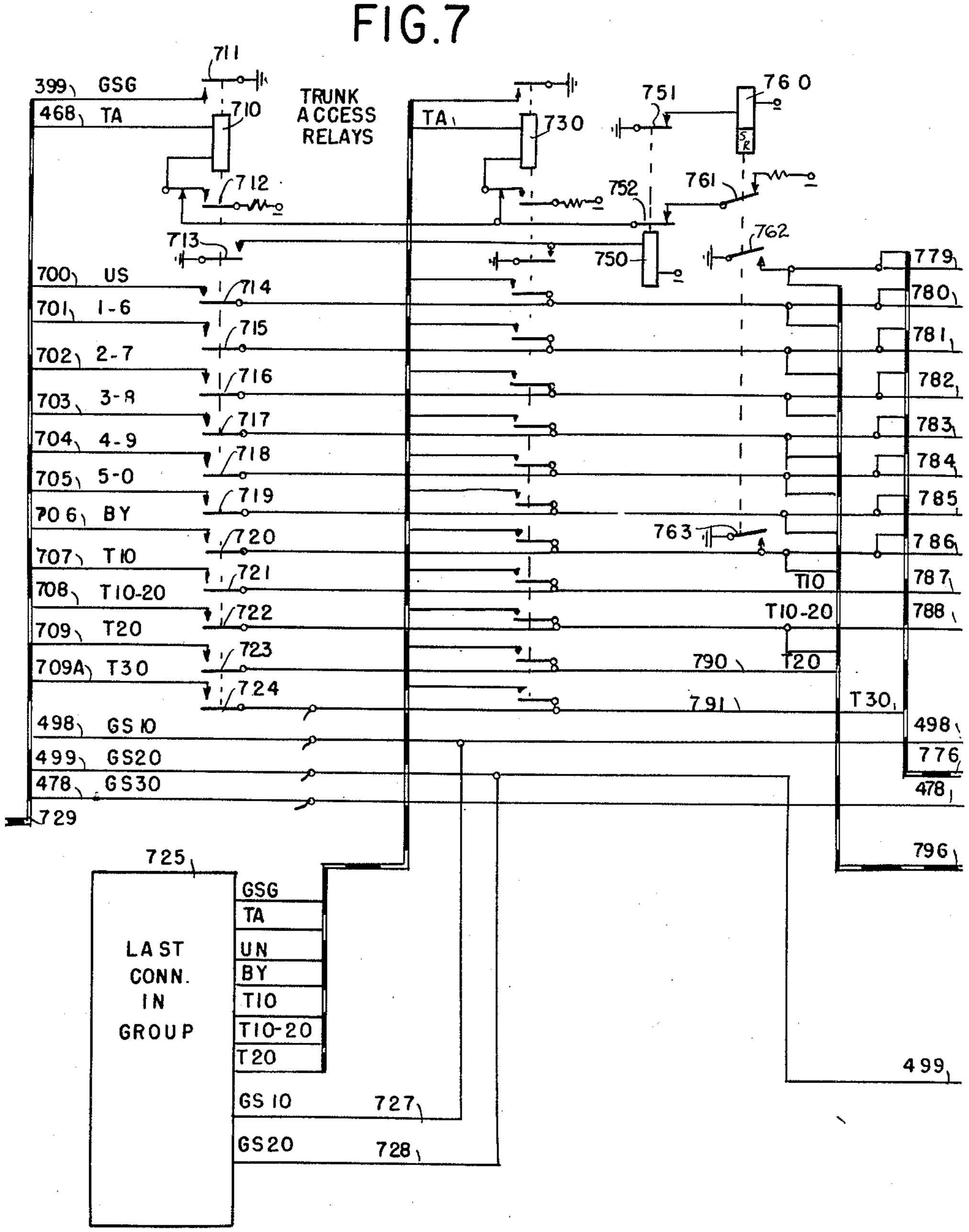

Figure 7 shows a group of trunk access relays, which form a part of the trunk selecting equipment. One such group is ordinarily required for each group of connectors, with an "access" relay such as 710 or 730 therein for each switch in the associated connector group. Thus, in Figure 7, relay 710 is associated with the connector switch of Figures 1 to 6, while relay 730 is associated with the last switch in the same group, indicated by the rectangle 725. Relay 750 is a "lockout" relay which operates when any access relay is operated, and momentarily prevents the operation of any other access relay in the same group. Relay 760 is a normally operated slow to release "kick-off" relay which releases if a trunk call fails to switch through promptly, to busy the connector and cause the trunk selecting relays to advance to a new trunk.

Figure 8:
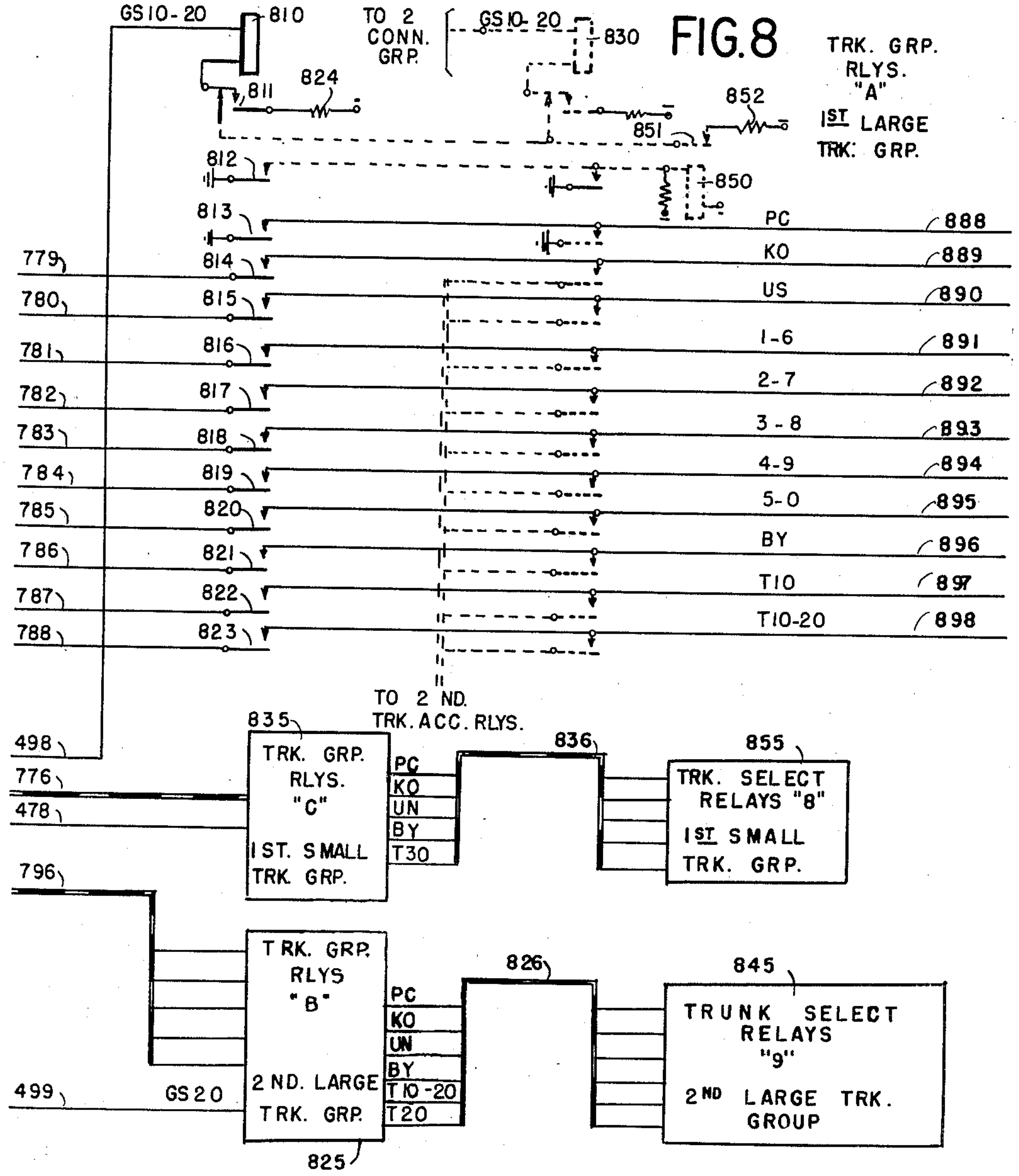
Figure 9:
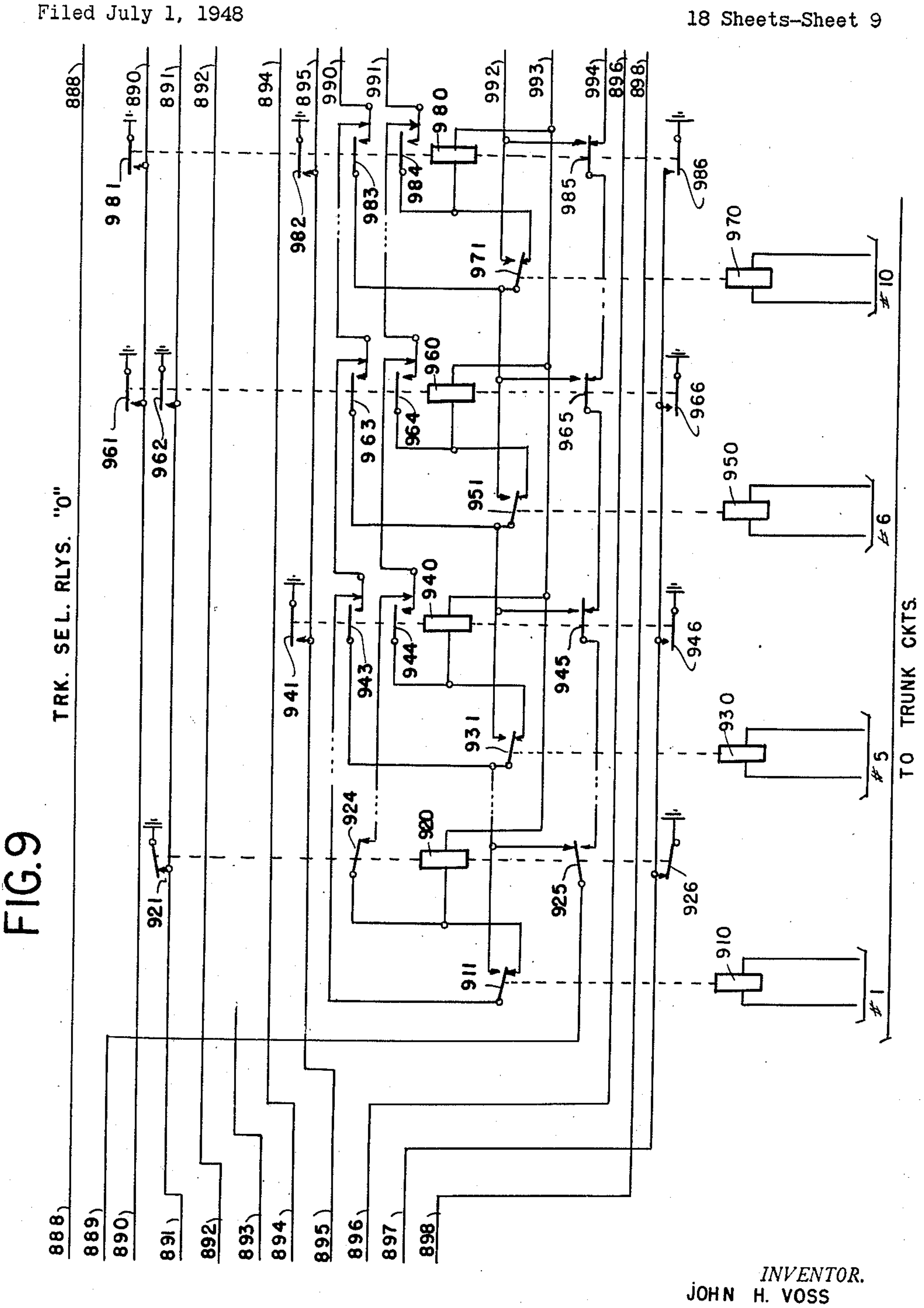
Figure 10:
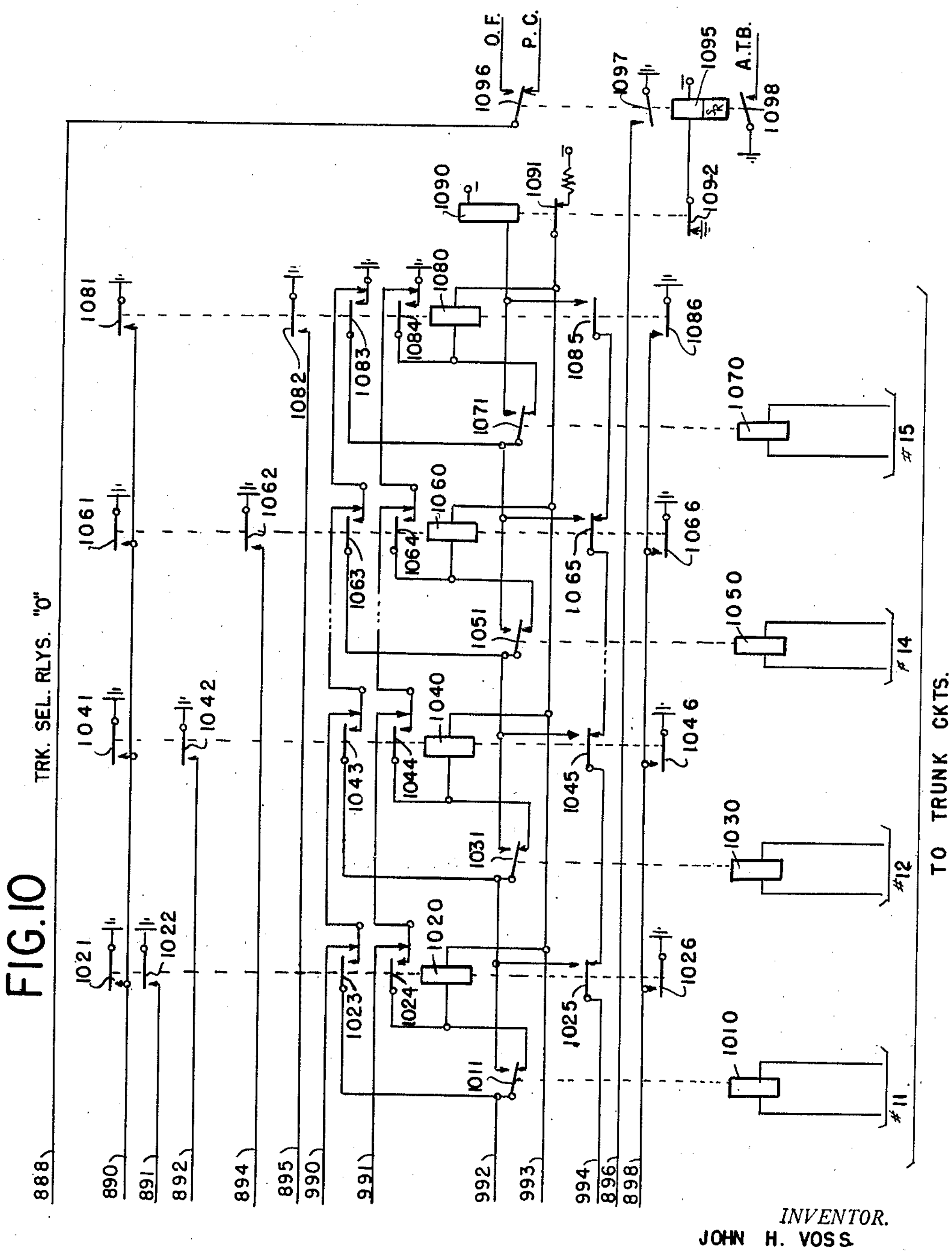

In the upper part of Figure 8 is shown a group of trunk group relays associated with the trunk select relays for the first 15-trunk group, which are shown in Figures 9 and 10. In the lower part of Figure 8, the rectangle 825 represents a similar unit of trunk group relays associated with the trunk select relays serving the second 15-trunk trunk group, represented by the rectangle 845. The rectangle 835 represents a group of trunk group relays associated with the small trunk group "C" the trunk select relays for which are represented by the rectangle 855. In each of these units, a "group" relay such as 810 is required, for each group of connector switches in the system. In the present instance there is assumed to be only one group of connectors, but a second group relay 830 is shown in dotted outline, to indicate the connections. Relay 850, also shown dotted, is a lockout relay which operates in the same manner as relay 750. In cases where there is only group relay involved, relay 850 may be omitted, and negative battery connected direct to the back contact of make-before-break springs 811.

Figures 9 and 10, as indicated in the preceding paragraph, show the trunk select relays for the first 15-trunk group "A." In this unit, a trunk busy relay such as 910 or 1010, and a "preselect" relay such as 920 or 1020 is provided for each trunk in the group. These busy relays are normally operated through contacts in the associated trunk repeaters, not shown, and release when the corresponding trunk is seized by a call. The preselect relays operate one at a time in rotation, as the trunks are taken into use, to preselect the next idle trunk. Relay 1090 is a "reset" relay which operates momentarily when the last trunk is seized by a call and relay 1095 is an "all-trunks-busy" relay. Only a portion of the trunk busy and preselect relays are shown, in order to conserve space.

With reference to the selector system, Figure 11 shows the incoming end of one of the selectors, which may also be assumed to be connected to an associated all-relay linefinder such as illustrated in the previously mentioned application Serial No. 720,756 via the line, test, hold and link busy conductors 1100 to 1105 shown on the left of the sheet. This figure also includes five control relays, numbered 1110 to 1150, of which 1110 is the "switch through" relay, 1120 the "line" relay, 1130 the "release" relay, 1140 the "dialling transfer" relay, and 1150 the "busy" relay, in addition to a "units switching" relay 1170.

Figure 12 shows the selector digit register comprising ten "counting" relays numbered 1210 to 1200, and three "counting control" relays numbered 40, 50 and 60. These relays are similar to those of the connector digit register of Figure 4 and operate similarly. The functions are slightly different however, due to the difference in the functions of the two switches.

Figure 13 shows three of the tens relays used with this selector, numbered 1340, 1350 and 1360, while Figure 14 shows another tens relay numbered 1430, and two of the five units relays required, numbered 1410 and 1420. Three trunk groups "L," "M" and "N" are indicated as being connected to the contacts of the tens relays illustrated. Trunk group "L" is a 15 trunk group, of which the first ten trunks are connected to tens relay 1430 and the last five to the 6th to 10th contact sets on the tens relay 1340; trunk group "M" is likewise a 15 trunk group, of which the first ten trunks are connected to tens relay 1350, and the last five to the 1st to 5th contact sets on tens relay 1340; and trunk group "N" is a group of ten trunks, all connected to tens relay 1360.

Figure 15:
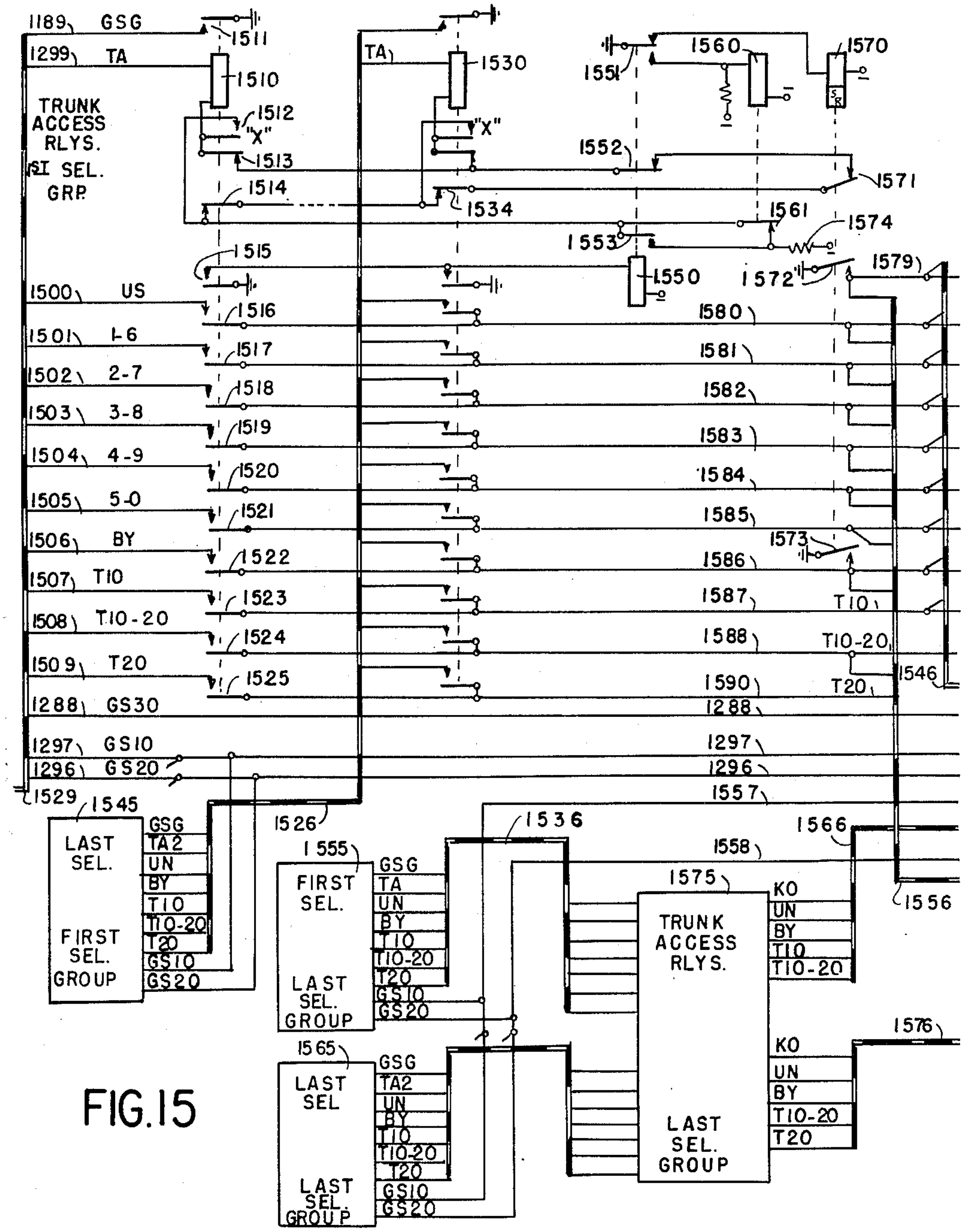

In the upper part of Figure 15 is shown a group of trunk access relays associated with a first group of selectors, a plurality of groups of selectors being assumed for this system, with the first selector of the first group being represented by the selector of Figures 11, 12, 13 and 14, and the last selector of the same group by the rectangle 1545 in the lower part of Figure 15. The rectangles 1555 and 1565 in Figure 15 represent the first and last selectors of the last selector group, while the rectangle 1575 represents another group of trunk access relays associated with the last selector group. These groups access units, one of which is required for each group of selectors, require an "access" relay such as 1510 or 1530 for each selector in the associated switch group. Relays 1550 and 1560 are "lookout" relays, while relay 1570 is a "kick-off" relay. The functions of these relays are similar to those of the corresponding relays of Figure 7.

Figure 16:
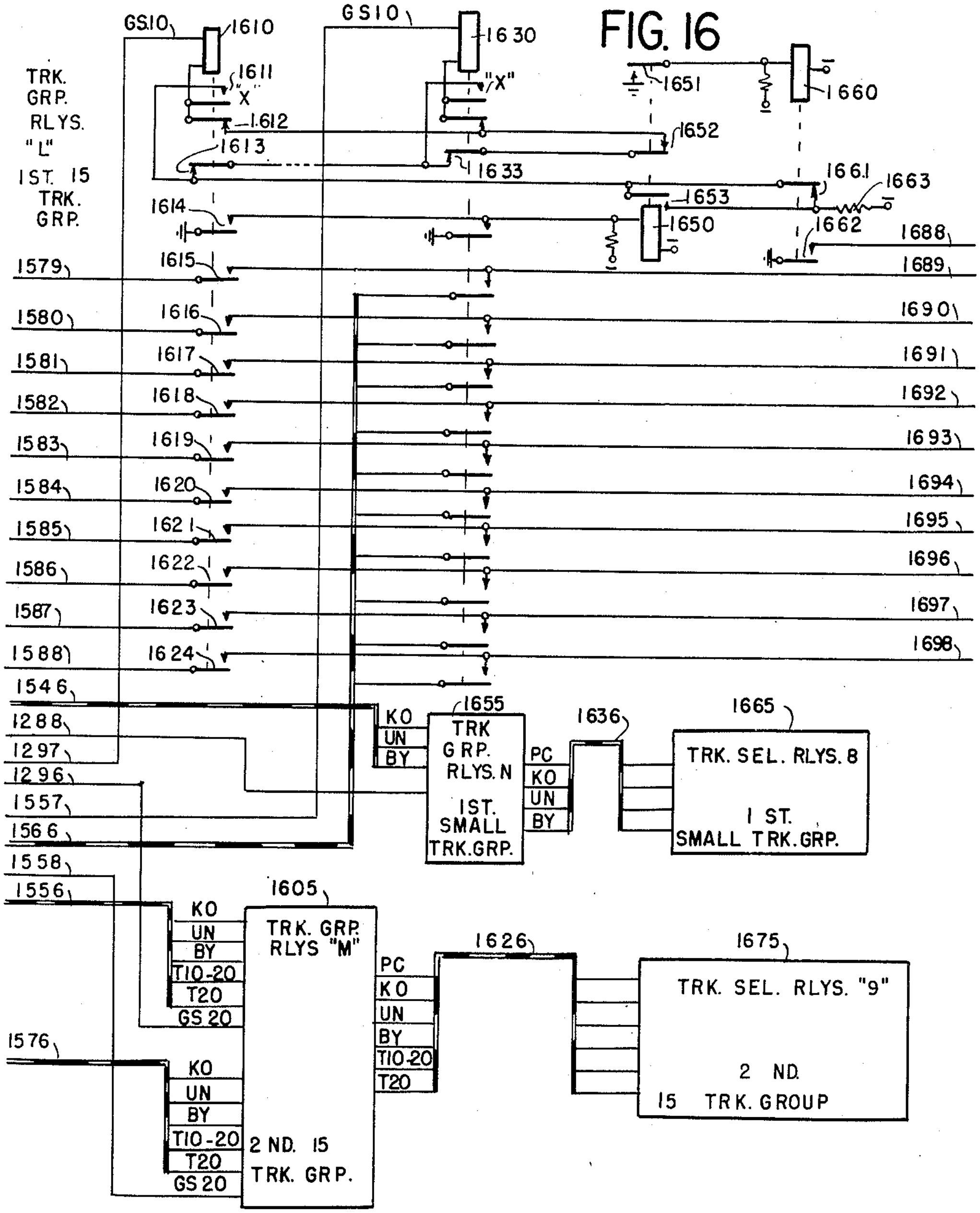
Figure 17:
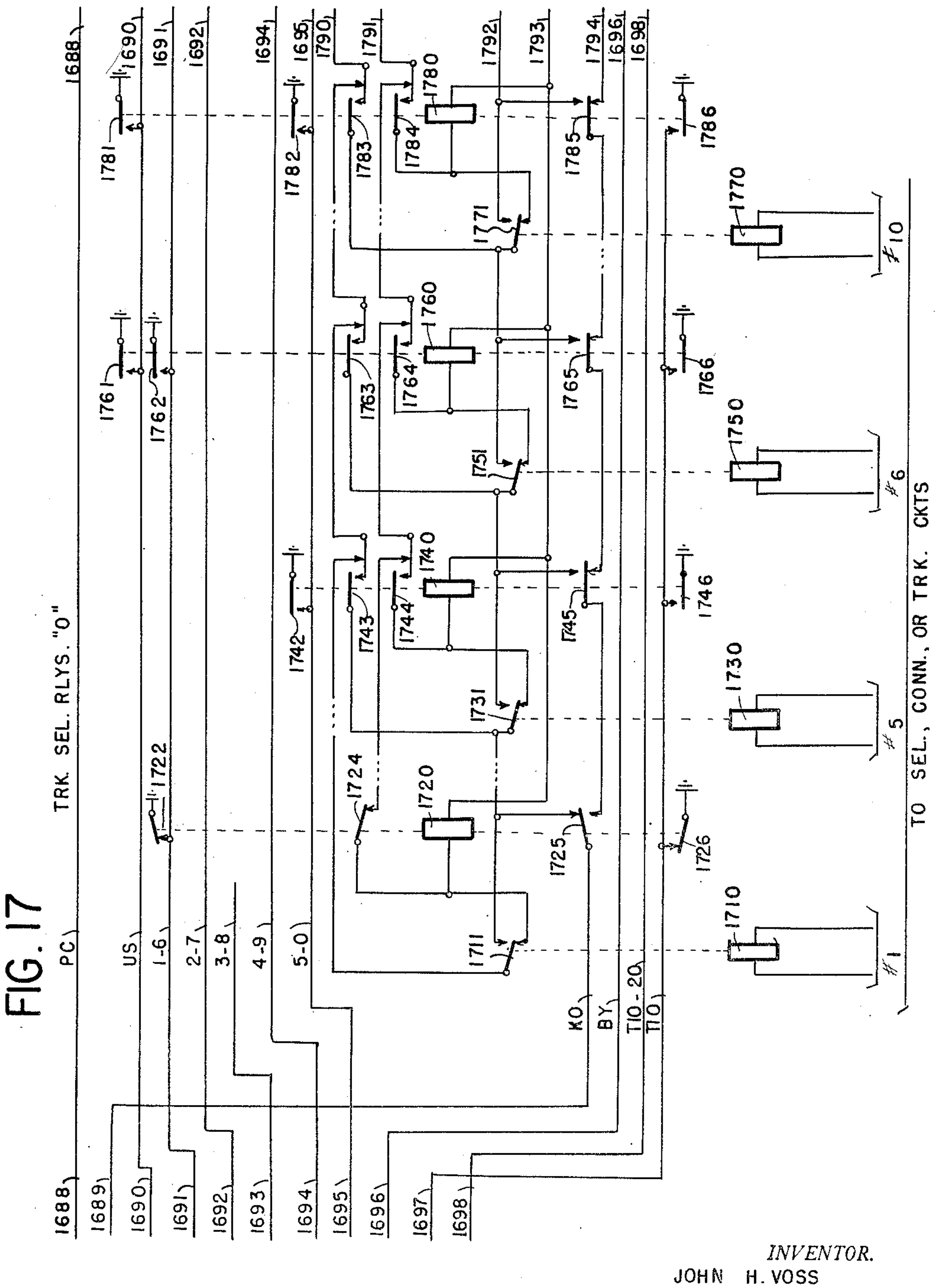
Figure 18:
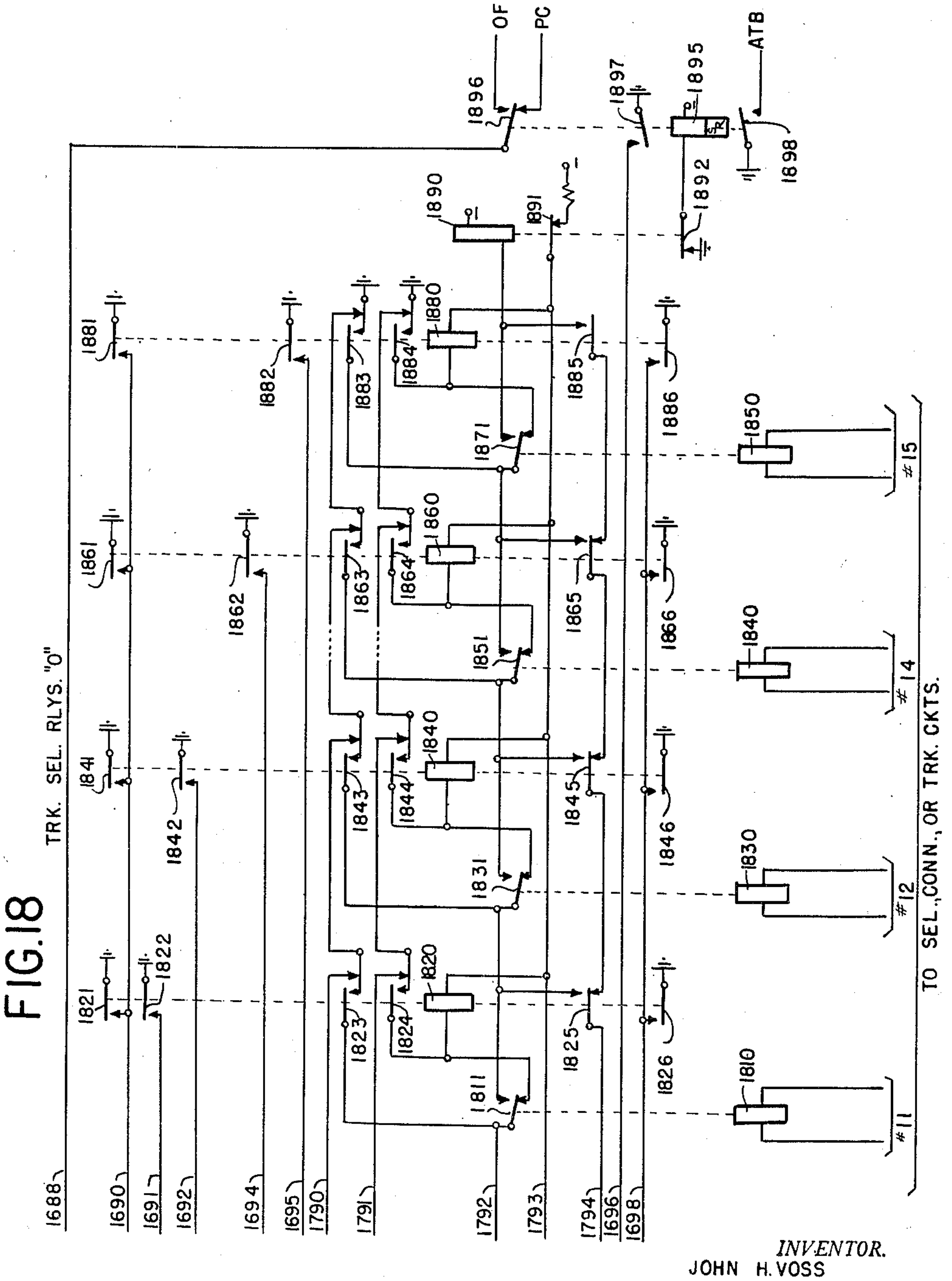

In the upper part of Figure 16 is shown a group of trunk group relays associated with the trunk select relays of the first 15 trunk group, which trunk select relays are shown in Figures 17 and 18. Another similar group of trunk group relays is indicated in the lower part of Figure 16 by the rectangle 1605, which is associated with a second group of trunk select relays similar to those of Figures 17 and 18, and represented by the rectangle 1675, for handling the second 15-trunk group. The rectangle 1655 represents a unit of trunk group relays associated with the small trunk group "N," the trunk select relays for which are represented by the rectangle 1665. In each of these trunk group units, a group relay such as 1610 or 1630 is provided, for each selector group. Each unit is also provided with a pair of lockout relays such as 1650 and 1660.

Figures 17 and 18 finally show the trunk select relays for the first 15-trunk trunk group of the selector system. These trunk select relays are identical with those of Figures 9 and 10, and consist of a "trunk busy" relay such as 1710 or 1810, and a "preselect" relay such as 1720 or 1820 for each trunk, together with a "reset" relay such as 1890, and an "all trunks busy" relay such as 1895. The trunk busy relays may be controlled from repeaters, connectors, or other selectors, depending on whether the trunks involved are outgoing trunks to other exchanges, or local trunks to connectors, or to another rank of selectors.

The description of the drawings and apparatus having now been completed, the operation of the circuits will now be described, by actually tracing one or more calls through each system.

*Connector system-trunk calls*

To make a call to the first 15-trunk group of trunks associated with connector relays 640 and 550, which may be assumed to be toll trunks, a calling subscriber, after removal of his receiver or handset in the usual manner, has only to dial the single-digit call number "0."

Upon removal of the handset a relay type line-finder not shown, but which may be considered similar to that of application Serial No. 720,756 as previously mentioned, finds the calling line, and automatically switches it through to an associated connector switch, such as that shown in Figures 1 to 6 herein, in known manner. The connector line relays 120 and 125 thereupon operate over the following circuit: ground through relay 125, upper left winding of the repeating coil 135, conductor 149, back contacts 382, conductor 148, back contacts 131 and 111, talking conductor 100 through the finder to the calling telephone and back again through the finder to talking conductor 101, back contacts 112 and 132, lower left winding of the repeating coil, and through relay 120 to negative battery.

Line relay 125 upon operating, at make contacts 126 prepares a circuit for battery reversing relay 130, while line relay 120, at make contacts 121 operates pulsing relay 140, from ground through back contacts 183 on the hold relay. Pulsing relay 140 upon operating, at make contacts 141 closes a locking circuit for itself, through the resistor 107, and at make contacts 142 operates release relay 150. Release relay 150 thereupon at contacts 153 prepares a priming circuit for line relay 120, at contacts 152 prepares a circuit for pulse control relay 160, and at contacts 151 operates hold relay 180.

Hold relay 180 upon operating, at contacts 182 connects the ground from contacts 151 to test conductor 102, which ground is then passed back through the finder, to clear the calling line of attachments in known manner. Relay 180 also, at contacts 189 grounds the tone start conductor 175, and at contacts 181 completes a dial tone circuit as follows: dial tone generator, not shown, dial tone conductor 367, break contacts 351 and 341, conductor 158, capacitor 109, make contacts 181, the lower right winding of the repeating coil 135, the capacitor Y, and the inductance 108 to ground. Dial tone thereupon passes over this circuit, and thence through the repeating coil by induction to the calling line, where it is made audible in the receiver of the calling telephone in known manner. Hold relay 180 further, at break contacts 183 opens the original operate circuit for pulsing relay 140 now locked to itself, at make contacts 183 prepares various lock-up circuits, at make contacts 184 closes another circuit to release relay 150 from ground at contacts 122, at make contacts 185 prepares the pulsing circuit, at break contacts 186 marks the conductor busy at the link allotter not shown, associated with the line-finder not shown, at make contacts 187 extends ground from break contacts 117 to the "in" terminal of the upper winding of the switching relay 320, at make contacts 188 prepares lock-up circuits for the switching and digit transfer and tens and units relays, and at make contacts 189A connects ground from back contacts 172 to the hold conductor 105 to lock-up the line finder.

The calling subscriber upon hearing the dial tone, dials the digit "0" as previously indicated, whereupon relay 125 releases and re-operates once, and line relay 120 releases and re-operates ten times. Upon the first interruption of the line circuit, line relay 125 restores without effect, but line relay 120 at make contacts 121 opens the circuit of pulsing relay 140 which also restores. Line relay 120 also at make contacts 122 opens one of the circuits to release relay 150, and at back contacts 122 closes a priming circuit to line relay 120, by way of make contacts 153 and the resistor 106. The line relay 120 will not re-operate over this circuit, but is partly energized, so as to enable it to re-operate more quickly when the line circuit is again closed.

Pulsing relay 140 upon restoring, at make contacts 141 further opens its own locking circuit, at break contacts 141 operates pulse control relay 160, and at make contacts 142 opens the second circuit to release relay 150, thereby de-energizing this relay momentarily. Relay 150 having been made slow to release is not affected outwardly, and remains operated. Pulsing relay 140 further, at back contacts 142 closes the pulsing circuit to the dialing transfer relays and the digit register as follows: ground through back contacts 142, break contacts 116, make contacts 165, conductor 169, back contacts 224, conductor 293, break contacts 314, right on conductor 408 to battery through transfer relays 370 and 380 in parallel, and left on conductor 408 to battery through back contacts 34, 24 and 14, and counting relay 410.

Dialling transfer relays 370 and 380 operate over this circuit, and relay 370 at break contacts 372 disconnects the operate springs of the counting relays temporarily and at make contacts 374 closes a circuit to the upper winding of relay 380. Relay 380 at make contacts 382 connects direct ground to the positive talking conductor 100 over conductor 143, at back contacts 382 disconnects line relay 125 from the positive talking conductor, and at make contacts 383 re-operates line relay 125 from battery through resistor 385. Counting relay 410 also operates, and at make contacts 416 and 417 prepares circuits for counting relay 420 and counting control relay 10, the latter now shunted by ground on both sides of its winding. The line circuit for pulsing is thus through only one winding of the repeating coil.

Upon the re-closure of the line circuit by the subscriber's dial, the line relay 125 is unaffected but line relay 120 re-operates, from the ground at make contacts 382, to re-energize release relay 150, and to re-operate pulsing relay 140 from ground at make contacts 161. Pulsing relay 140 upon re-operating locks itself up as before, releases pulsing control relay 160, and opens the pulsing circuit. The opening of the pulsing circuit removes the shunt from counting control relay 10 which thereupon operates and locks-up counting relay 410 over the following circuit: ground at make contacts 183 on the hold relay, break contacts 191 on the register release relay, break contacts 114, conductor 168, break contacts 313, conductor 409, break contacts 25, winding of relay 10, make contacts 417, and the winding of relay 410 to battery. The circuit of dialling transfer relay 370 is opened at the same time, but this relay being slow to release, remains operated until after the last pulse of the digit and holds relay 380 also operated. The line, pulsing, and pulse control relays 120, 140 and 160 continue the foregoing action in response to the remaining dial pulses. On the second impulse, register relays 420 and 20 operate and release relays 410 and 10, on the third impulse 430 and 30 operate and release 420 and 20, on the fourth impulse relays 440 and 10 operate and release 430 and 30, and so on, until at the end of the tenth and last impulse, counting relay 400 and counting control relay 10 are locked operated, and all of the other relays of the register are normal.

Shortly after the last impulse, dialling transfer relay 370 restores, and permits the release of transfer relay 380. Relay 380 thereupon re-connects line relay 125 to the calling line, in series with relay 120, thereby restoring the line to its original balanced condition. Transfer relay 370, at break contacts 372 and 373 connects ground from conductor 418 to conductors 1 and 2 leading to the counting relays. The ground on conductor 1 is without effect at this time, due to encountering only open contacts at the counting relays, but the ground on conductor 2 passes through make contacts 402 on the tenth counting relay, and operates access relay 710. The complete circuit for relay 710 may be traced as follows: ground from make contacts 183 on the hold relay, conductors 176 and 415, make contacts 13, conductor 418, break contacts 372, 342 and 252, conductor 2 through cable 479, make contacts 402, conductor 468 through cable 729, winding of relay 710, back contacts 712 and 752, and make contacts 761 and the associated resistor to battery.

Access relay 710 upon operating over this circuit, at its lower make contacts extends the connector units control conductors and the busy conductor to the various trunk group relay units associated with the different trunk groups, extends the tens control conductor for the connector T10 relay 640 to the trunk group relays associated with the first large trunk group "A," extends the tens control conductor for the T20 tens relay 560 to the trunk group relays associated with the second large trunk group "B," extends the tens control conductor for the T10—20 relay 550 to both of the foregoing group relay units, and extends the tens control conductor for the T30 relay 570 to the trunk group relays associated with the first small trunk group "C." Access relay 710 also, at make contacts 712 locks itself operated, at make contacts 713 operates lockout relay 750 momentarily to prevent the operation of any of the other access relays at this time, and at make contacts 711 operates group relay 810 over the following circuit: ground at contacts 711, conductor 399 through cable 728, break contacts 357 and 375, conductors 7 through cable 479, make contacts 405, conductor 498 through cable 729, winding of relay 810, and back contacts 811 to battery through the resistor 852.

Trunk group relay 810 upon operating over this circuit, at make contacts 811 locks direct to battery through resistor 824, at contacts 813 grounds the peg count conductor 888 to Figure 10 to operate a peg count meter or an overflow meter, depending on the position of the all-trunks-busy relay 1095, at contacts 814 prepares the kick-off circuit, and at contacts 821 prepares a busy circuit from relay 1095. Relay 810 also, at contacts 815 to 820 inclusive extends the connector units control conductors to the trunk select relays of Figures 9 and 10, and at contacts 822 and 823 extends the T10 and T10—20 tens control conductors to the same relays.

Upon the extension of the tens and units control conductors to the trunk select relays of Figures 9 and 10 as stated, assuming all of the trunks of the first 15-trunk trunk group to be idle and preselect relay 920 operated as shown, ground from make contacts 926 and 921 of this relay cause the simultaneous operation of the connector T10 tens relay 640 and the 1–6 units relay 620. The circuit for relay 640 is from ground at contacts 926, through conductor 897, make contacts 822, conductor 787, make contacts 721, conductor 707 through the cable 729, and winding of relay 640 to battery. The circuit for relay 620 is from ground at contacts 921, through conductor 891, make contacts 816, conductor 781, make contacts 715, conductor 701 through cable 729, and the winding of relay 620 to battery.

The tens relay 640 upon operating, at make contacts 643 extends the ground from control conductor 707 to conductor 395 and thence to digit transfer relay 340 which has ground also on the other side of its winding from conductor 179. The units relay 620 upon operating, at make contacts 628 extends the ground from control conductor 701 to conductor 396 and thence to digit transfer relay 360, which also has ground on the other side of its winding, from conductor 179. These digit transfer relays therefore remain at normal for the moment. Further to the foregoing, units relay 620 also, at make contacts 627 operates the switch through relay 110 over the following circuit: ground from make contacts 188 on conductor 179, contacts 627, conductor 398, break contacts 356 and 316, conductor 195, and the winding of relay 110 to negative battery.

Switch-through relay 110, upon operating over this circuit, at back contacts 111 and 112 disconnects the line relays 120 and 125 from the calling line, and at make contacts 111 and 112 connects the calling line, free of the repeating coil 135, direct to the first trunk 1A of the called trunk group, by way of conductors 156 and 164, back contacts 611 and 612, make contacts 621 and 622, and make contacts 644 and 645. The trunk repeater, not shown, associated with this trunk thereupon returns ground over its test conductor to make contacts 646, and upon the operation of switch-through relay 110, this ground passes by way of make contacts 623, back contacts 613, conductor 167 and make contacts 113, to test conductor 102, in anticipation of the restoration of the connector line, pulsing and release relays 120, 125, 140 and 150, following the operation of relay 110. Switch through relay 110 also, at break contacts 114 opens the locking circuit to the digit register, at break contacts 115 disables the busy relay 310, at break contacts 116 disconnects the pulsing circuit to the counting relays, and at break contacts 117 disables the switching relay 320.

As a result of the removal of ground from the locking conductors 168 and 409 at break contacts 114, the operated register relays 10 and 400 restore and open their make contacts. Make contacts 13 and 402 thereupon open the circuit of access relay 710, while make contacts 405 open the circuit of trunk group relay 810, whereupon both of these relays restore, and disconnect the tens and units control conductors leading to the connector. This opens the operate circuits of the operated tens and units relays 640 and 620, and removes the ground shunt from digit transfer relays 340 and 360. Relay 340 accordingly operates in series with relay 640 and locks the latter operated from ground on conductor 179, by way of conductor 395 and make contacts 643. Relay 360 operates similarly in series with relay 620 and locks the latter operated over conductor 396 and make contacts 628.

The extension of the calling line to the trunk 1A as just described, causes the trunk repeater associated with this trunk to open the normally closed circuit of the associated trunk busy relay 910. Relay 910 thereupon restores and at back contacts 911 causes the operation of the second preselect relay, not shown, over the following circuit: ground from back contacts 1083 through similar contacts in series on all of the other preselect relays except the first, back contacts 911, make contacts corresponding to make contacts 931 on the second trunk busy relay, not shown, and the winding of the second preselect relay, not shown, to battery through break contacts 1091 and the associated resistor.

The second preselect relay upon operating, at contacts corresponding to contacts 943 closes another operate circuit for itself and opens its original operate circuit. The second preselect relay also, at contacts corresponding to contacts 944 closes a locking circuit for itself, and opens the locking circuit of the first preselect relay 920 which restores. The second preselect relay further, at contacts corresponding to contacts 946 and 941 grounds the T10 tens marking conductor 897 and the 2–7 units marking conductor 892, so that the next call to this trunk group will be directed to the 2nd trunk. In similar manner, a third call will be directed to the 3rd trunk, a fourth call to the 4th trunk, and so on. When the 4th trunk is taken into use, preselect relay 940 operates to preselect the 5th trunk, when the 5th trunk is taken into use preselect relay 960 operates, when the 9th trunk is taken into use preselect relay 980 operates, and when the 10th trunk is taken into use preselect relay 1020 operates. The 6th to 10th preselect relays in addition to marking the T10 tens conductor and the first to the fifth units conductors as required, also mark the units switching conductor 890 from contacts such as 961 and 981. This prepares the operation of the connector units switching relay 610 and the selection of a trunk in the 6 to 10 sub-group, in known manner.

Upon the 11th call to this trunk group, the operation of the trunk access and trunk group relays associated with the calling connector extends the marking and control conductors to the trunk select relays in the usual way. Preselect relay 1020, which is now operated, thereupon causes the operation of the T10–20 tens relay 550, the 1–6 units relay 620, and the units switching relay 610 in the calling connector from ground at make contacts 1026, 1022 and 1021. The circuit for relay 550 is from contacts 1026, over conductor 898, contacts 823, conductor 788, contacts such as 722 on the operated access relay, and conductor 708 to relay 550. The circuit for relay 620 is from contacts 1022 over conductor 891, contacts such as 816 and 715, and conductor 701 to relay 620. The circuit for relay 610 is from contacts 1021 over conductor 890, contacts such as 815 and 714, and conductor 700. Relay 610 locks direct to conductor 179, relays 550 and 620 lock through the digit transfer relays 340 and 360, and relay 620 operates switching-through relay 110 through make contacts 627, in the manner previously described. Relay 110 in turn releases the digit register and the trunk access and trunk group relays as before, and switches the calling line through to the trunk 11A, by way of conductors 156 and 164, make contacts 611 and 612, make contacts 624 and 625, and make contacts 557 and 558.

The trunks 12A to 15A of this group are selected in like manner, and when the last trunk is thus taken into use, trunk busy relay 1070 restores, and causes the operation of reset relay 1090 from ground through make contacts 1083 and back contacts 1071. Reset relay 1090 upon operating, at break contacts 1092 opens the circuit of the normally energized all trunks busy relay 1095, and at break contacts 1091 disconnects negative battery from the preselect relays. Preselect relay 1060 thereupon restores, and releases reset relay 1090, which re-connects battery to the preselect relays, and ground to relay 1095. If the 1st trunk is again idle at this time, and trunk busy relay 910 operated, preselect relay 920 will re-operate, from ground at back contacts 1083, through back contacts of the other preselect relays in series, and make contacts 911. The 16th call to this trunk group will thus be directed to trunk 1A, and the cycle repeats, skipping any still busy trunks as necessary.

If no idle trunks are available in this trunk group at the time the last trunk is taken into use, the release of trunk busy relay 1070 will operate reset relay 1090, and reset relay 1090 will cause the release of preselect relay 1080 in the manner stated. The release of preselect relay 1080 however, will now close an alternative circuit to reset relay 1090 from ground at back contacts 1083, through similar back contacts on the other preselect relays, and then through back contacts corresponding to back contacts 911 and 931 on these relays. Reset relay 1090 accordingly remains operated, and keeps break contacts 1092 open. The slow to release all-trunks busy relay 1095 accordingly restores after an interval, and at break contacts 1096 prepares a circuit to an overflow meter, not shown. Relay 1095 also, at break contacts 1098 operates an all-trunk-busy meter not shown, and at break contacts 1097 prepares a busy circuit.

In case any calls are attempted to this trunk group while all trunks are thus busy, the control conductors will be extended to the trunk select relays in the usual way, but no tens or units relays in the connector will be operated, since the preselect relays are all normal, and the connector will not switch through. Ground from make contacts 1097 of the all-trunks-busy relay however, will operate the connector busy relay 310 by way of conductor 896, contacts such as 821 and 720, conductor 706 through cable 729, connector test conductor 167, back contacts 363, conductor 166, break contacts 115 and conductor 165 to relay 310.

The connector busy relay 310 upon operating over this circuit, at make contacts 312 locks by way of conductor 196 and break contacts 173 to ground at make contacts 183. Relay 310 also, at make contacts 311 closes a busy tone circuit as follows: busy tone generator, not shown, busy tone conductor 368, contacts 311, conductor 158, capacitor 109 and make contacts 181 to the repeating coil. From here it is induced into the calling line, as notice to the calling party that no trunks are available in the group at the moment, and that he should hang up and try again after a short interval. In addition to the foregoing, busy relay 310 also, at break contacts 316 and 315 disconnects the switch-through and switching relays 110 and 320, at break contacts 314 disconnects the pulsing circuit to the digit register, and at break contacts 313 opens the locking circuit to the digit register. The operated register relays 10 and 400 accordingly restore, and release the operated access and trunk group relays.

In the case of a blocked call, where with idle trunks available in the called group, the switch-through relay in the connector fails to operate promptly to switch the call through, the register relays will remain operated, and will therefore, fail to release the operated trunk access and trunk group relays in the trunk selecting equipment. Kick-off relay 760 will accordingly restore, after an interval, and ground the kick-off and busy conductors. Thus, ground from break contacts 762 is passed forward over kick-off conductor 779 to the trunk select relays where it passes through make contacts such as 925 on the operated preselect relay to the next available preselect relay which operates and releases the first relay. At the same time, ground from break contacts 763 passes back over conductor 786 through contacts 720 and conductor 706 and operates the connector busy relay 310, which releases the trunk operated trunk access and trunk group relays and gives the busy signal to the calling line in the manner just described.

To call the second large trunk group, the calling party will dial the single-digit call number "9," rather than "0" as for calls to the first group. The digit register will thereupon count off nine pulses, leaving relays 490 and 30 locked operated in series, and all of the other register relays normal. Shortly after the last impulse dialling transfer relays 370 and 380 restore in the manner previously explained, and relay 370 again connects ground from conductor 418 to the conductors 1 and 2 leading to the counting relays. The ground on conductor 2 is now without effect, due to encountering only open contacts at the counting relays. The ground on conductor 1 however, passes through make contacts 492 and conductor 468 to Figure 7, where it causes the operation of trunk access relay 710.

Access relay 710 upon operating, locks itself operated, and at its lower make contacts extends the connector tens and units and miscellaneous control conductors to the various sets of trunk group relays associated with the different trunk groups, as previously explained. Relay 710 also operates lockout relay 750 as before, and at make contacts 711 closes a circuit to a group relay corresponding to relay 810, in the trunk group unit 825 associated with the trunk select relays 845, over the following circuit: ground at contacts 711, conductor 399 to Figure 3, break contacts 357 and 375, conductor 7 to Figure 4, make contacts 495, and conductor 499 across Figures 6 and 7 to the stated group relay, not shown, in the rectangle 825.

The stated trunk group relay upon operating, locks itself operated, and extends the peg count conductor, the kick-off conductor, the units control conductors, the busy conductor, and the T20 and T10—20 tens control conductors to the trunk select relays 845. If all of the trunks in the "B" trunk group are idle, the trunk select relays 845 will thereupon operate the connector T20 tens relay 560 and the 1–6 units relay 620, by way of the cables 826 and 796, conductors 790 and 781, make contacts 723 and 715, and conductors 709 and 701 through the cable 729. Units relay 620 then passes ground through contacts 627 to conductor 398 to operate switch-through relay 110 as before, and the latter relay again releases the digit register and the trunk selecting equipment, and switches the call through to the trunk 1B, by way of back contacts 611 and 612, make contacts 621 and 622, and make contacts 564 and 565. Further calls to this trunk group are directed similarly to the succeeding trunks, with the T10—20 tens relay 550 operating on the 11th to 15th calls to direct these calls to the trunks 11B to 15B connected to the first five sets of contacts on this relay. In this case, the units switching relay 610 will not operate on calls directed to the last five trunks of the B trunk group.

To call the first small trunk group "C," indicated as being connected to the first five sets of contacts on the T30 tens relay 570, the calling party will dial the single digit call number "8." The digit register in the connector involved will thereupon count off eight steps, in response to the dial pulses, leaving relays 480 and 20 locked operated, and all of the other register relays normal. Dialling transfer relays 370 and 380 operate as usual on the first pulse and release shortly after the last pulse. Relay 370 upon releasing again passes ground from conductor 418 through contacts 372 to conductors 1 and 2. The ground on conductor 1 now encounters open contacts at the counting relays, but the ground one conductor 2 passes through make contacts 482 and conductor 468 to Figure 7, where it again causes the operation of access relay 710.

Trunk access relay 710 thereupon locks itself operated, operates lock out relay 750 momentarily, and at its lower make contacts extends the various tens and units and miscellaneous control conductors to the various trunk group relays associated with the various trunk groups, as before. Access relay 710 also, at make contacts 711 causes the operation of a trunk group relay not shown, in the trunk group unit 835 associated with the trunk group relays 855 over the following circuit: ground at contacts 711, conductor 399 to Figure 3, break contacts 357 and 375, conductor 7 to Figure 4, make contacts 485, and conductor 478 across Figures 6 and 7 to the stated group relay in the rectangle 835.

The stated trunk group relay upon operating, locks itself operated, and extends the peg count conductor, the kickoff conductor, the units control conductors, the busy conductor, and the T30 tens control conductor to the trunk select relays 855. If the first trunk in the "C" trunk group is idle, the trunk select relays 855 will now operate the connector T30 tens relay 570 and the 1–6 units relay 620, by way of the cables 836 and 776, conductors 791 and 781, make contacts 724 and 715, and conductors 709A and 701 through the cable 729. Units relay 620 upon operating, passes ground through make contacts 627 to conductor 398 for the operation of switch through relay 110. Relay 110 in turn releases the digit register and the trunk selecting equipment, and switches the call through to the trunk 1C, by way of back contacts 611 and 612, make contacts 621 and 622, and make contacts 574 and 575. Further calls to this trunk group will be directed in succession to the trunks 2C to 5C, when the trunk select relays 855 will be reset, and the preselection cycle will repeat, in the manner already explained in connection with calls to the large trunk groups.

*Connector system-local calls*

In this system each subscriber line is assigned a 4-digit call number commencing with either a "2" or a "3." The first digit is required to select the code group of the ringing signal, in the case of calls to party lines, the digit "2" indicating a call signal in the first ten codes, and the digit "3" indicating a call signal in the second ten codes. The second digit selects the tens group, the third digit selects the line, and the last digit selects the ringing code in the selected code group and the side of the line to be rung.

To show the operation of the system on local calls, let it first be assumed that a call is to be made to a station on the subscriber line "86" shown connected to contacts on the T30 tens relay 570. Let it further be assumed that the call number of the wanted station is "2861." When the calling party removes the handset to start the call, the calling line is extended to a connector such as shown in Figures 1 to 6, and, causes the operation of the line relays 120 and 125 therein, in the same manner as previously described for a trunk call. Line relay 120 thereupon operates pulsing relay 140, which operates release relay 150, and the release relay in turn operates hold relay 180, as before. The hold relay thereupon at contacts 182 and 189A again grounds the test and hold conductors 102 and 105, and at contacts 181 passes dial tone from conductor 158 to the calling line, through the repeating coil 135.

The calling party, upon hearing the dial tone signal in the receiver of the calling telephone dials the first digit "2" of the call number "2861." Line relay 120 and pulsing relay 140 thereupon release and re-operate twice, in the manner previously explained, and pulsing relay 140 at back contacts 142 passes two pulses to the digit register, over the regular pulsing circuit comprising contacts 116, 185, 224 and 314, and conductor 408. Dialling transfer relays 370 and 380 operate as before on the first pulse to disable the springs of the counting relays and to disconnect and hold line relay 125 during the pulsing. The digit register, in response to the pulses, counts off two steps, leaving counting relay 420 operated in series with the counting control relay 20.

Transfer relays 370 and 380 restore, shortly after the second and last impulse, to re-connect the springs of the counting relays, and to re-establish the original line circuit through line relays 125 and 120 in series. Upon the release of relay 370 therefore, the closure of break contacts 372 causes the operation of the code select relay 330 over the following circuit: ground at make contacts 183 on the hold relay, conductors 176 and 415, make contacts 23, conductor 418, break contacts 372, 342 and 352, conductor 2 through the cable 479, make contacts 422, conductor 429, and the winding of relay 330 to battery.

Code select relay 330 upon operating, at make contacts 331 extends its own operate ground to the 1st digit transfer relay 350. This has no effect at the moment however since relay 350 has ground also on the other side of its winding from conductor 179 and make contacts 188 on the hold relay. Code select relay 330 also, at make contacts 333 closes a point in the circuit of the ringing pickup relay 240, and at make contacts 332 closes a circuit to the register release relay 190 as follows: ground from conductor 179 through contacts 332, break contacts 355 and 345, conductor 194, and the lower winding of relay 190 to battery. Relay 190 operates over this circuit, and at break contacts 191 opens the register lockup circuit by removing hold relay ground from conductors 168 and 409. The operated register relays 20 and 420 thereupon release and at make contacts 23 and 422 disconnect ground from conductor 429 leading to relay 330. This removes the shunt from digit transfer relay 350 and relay 350 operates in series with relay 330 and locks the latter operated, from ground on conductor 179, through relay 350 and make contacts 331. Transfer relay 350 thereupon, at break contacts 351 opens the dial tone circuit, at break-make contacts 352 and 353 disconnects conductors 1 and 2 and prepares circuits to conductors 3 and 4, and at make contacts 354 shunts break contacts 314 to prevent opening of the pulsing circuit by the operation of the busy relay on a reverting call. Transfer relay 350 also, at break contacts 355 opens the previously traced circuit to register release relay 190 which restores, at break contacts 356 disconnects the switch-through relay 110, at break contacts 357 disconnects conductor 399 coming from the trunk selecting equipment, and at make contacts 355 and 356 prepares additional circuits for the register release relay 190.

When the calling party dials the second digit "8" of the call number "2861," the line and pulsing relays 120 and 140 release and re-operate eight times, and relay 140 passes eight impulses to the digit register. The dialling transfer relays 370 and 380 operate as usual on the first impulse and the register relays count off eight steps, leaving counting relay 480 locked operated in series with counting control relay 20. Transfer relays 370 and 380 restore after a slight delay following the last pulse, and relay 370 thereupon at break contacts 372 causes the operation of the T30 tens relay 570 over the following circuit: hold relay ground from make contacts 183 through conductors 176 and 415, make contacts 23, conductor 418, break contacts 372 and 342, make contacts 352, conductor 4 through cable 479, make contacts 481, conductors 469 and 703A, and the winding of relay 570 to battery.

Tens relay 570 upon operating over this circuit at make contacts 573 extends its own operate ground over conductor 395 to the 2nd digit transfer relay 340 which has ground also on the other side of its winding from conductor 179. Relay 570 also, at make contacts 572 extends ground from conductor 179 to register release relay 190, by way of conductor 397, make contacts 355, break contacts 345, and conductor 194. Relay 190 operates over this circuit and at break contacts 191 opens the register locking circuit. The operated register relays 20 and 480 thereupon release and at contacts 23 and 481 remove operate ground from conductor 469 leading to tens relay 570. This removes the shunt from digit transfer relay 340 and this relay operates in series with relay 570 and locks the latter operated, from ground on conductor 179, by way of conductor 395 and make contacts 573. Digit transfer relay 340 upon operating, at break-make contacts 342 and 343 disconnects conductors 3 and 4 and prepares circuits to conductors 5 and 6, at make contacts 344 prepares a circuit for units switching relay 610, at break contacts 345 releases the register release relay 190, and at make contacts 346 grounds the ringing machine start conductor 425, by way of conductor 298 and break contacts 225.

When the calling party dials the third digit "6" of the call number, the line and pulsing relays 120 and 140 release and re-operate six times, and relay 140 passes six pulses to the digit register and to the dialling transfer relays 370 and 380. Relays 370 and 380 operate as before on the first pulse and release after the last pulse, and the register counts off six steps, leaving register relays 30 and 460 locked operated in series. As soon as counting relay 460 operates, it closes a circuit to the units switching relay 610 as follows: hold relay ground from make contacts 183, conductors 176 and 415, make contacts 465, conductor 8 through cable 479, make contacts 344, break contacts 365, conductor 394 and the upper winding of relay 610 to battery. Relay 610 operates over this circuit, reverses its contacts 611, 612 and 613, and at make contacts 614 locks through its lower winding to the grounded conductor 179. Shortly after the last pulse, the dialling transfer relays 370 and 380 restore, as before, and relay 370 now causes the operation of the 1–6 units relay 620 over the following circuit: ground from make contacts 183 on conductors 176 and 415, make contacts 33, conductor 418, break contacts 372, make contacts 342, break contacts 361, conductor 6 through cable 479, make contacts 463, conductor 488, and the winding of relay 620 to battery.

The 1–6 units relay 620, upon operating, extends the connector talking and test conductors 156, 164 and 167 to the called line "36" by way of make contacts 611, 612 and 613, make contacts 624, 625 and 626, and make contacts 580, 581 and 582. Relay 620 also, at make contacts 628 extends its own operate ground to the 3rd digit transfer relay 360, thereby shunting this relay, and at make contacts 627 extends ground from conductor 179 to register release relay 190, by way of conductor 398, make contacts 356, break contacts 366, and conductor 194. Relay 190 operates over this circuit and at break contacts 191 releases the operated register relays 30 and 360, and the latter relays, at contacts 33 and 463 open the operate circuit to units relay 620. This removes the shunt from digit transfer relay 360 which thereupon operates in series with relay 620, from ground on conductor 179, by way of conductor 396 and make contacts 628. Digit transfer relay 360 thereupon, at break contacts 361 and 362 disconnects conductors 5 and 6, at make contacts 362 prepares a circuit to the 4th digit transfer relay 220, at break-make contacts 363 disconnects the busy relay 310 from test conductor 167 and connects up the switching relay 320 in its place, at make contacts 364 shunts break contacts 313 to provide an alternative locking circuit for the register relays for use on a reverting call, at break contacts 365 disconnects the units switching relay 610, and at break contacts 366 opens the circuit of register release relay 190 which restores.

If the called line had been busy, ground on its test conductor would have caused the operation of busy relay 310 immediately after the operation of units relay 620, and before the operation of digit transfer relay 360, over the following circuit: test conductor ground, make contacts 582, 626 and 613, conductor 167, break contacts 363, conductor 166, break contacts 115, conductor 165, and the winding of relay 310 to battery. Busy relay 310 upon operating, at make contacts 311 passes busy tone from conductor 308 to the repeating coil 135 and thus to the calling line, by way of conductor 158, capacitor 169, and make contacts 181, at make contacts 312 locks by way of conductor 196 and break contacts 173 to hold relay ground at make contacts 183, and at break contacts 315 disconnects switching relay 320 to prevent its operation. The other contacts on relay 310 are without effect at this time, although break contacts 313 open the register lockup circuit at about the same time as break contacts 191 on the register release relay do so.

If the called line is idle however, its test conductor will have negative battery from the line equipment on it instead of ground, and this battery will shunt busy relay 310 and prevent its operation. As soon as digit transfer relay 360 operates therefore, this battery causes the operation of switching relay 320, by way of make contacts 582, 626, 613 and 363, break contacts 315, upper winding of relay 320, conductor 177, make contacts 187, and break contacts 117 to ground. Switching relay 320 upon operating, at make contacts 321 and 322 extends the connection to the called line, at make contacts 323 puts direct ground from conductor 177 on test conductor 167 to mark the called line busy, at make contacts 324 locks through its lower winding to grounded conductor 179, at make contacts 325 prepares at circuit to the ringing pickup relay 240, and at make contacts 326 prepares a start circuit to the ringing interrupter.

When now, the calling party dials the fourth digit "1" of the call number "2861," the line and pulsing relays 120 and 140 release and re-operate once and pass a single pulse to transfer relays 370 and 380 and to the digit register. Relays 370 and 380 accordingly by operate and the register counts off one pulse, leaving register relays 10 and 410 locked operated in series. The dialing transfer relays then release, after a short delay, whereupon relay 370 causes the operation of the 4th digit transfer relay 220 over the following circuit: ground from make contacts 183 on conductors 176 and 415, make contacts 13, conductor 418, break contacts 372 and 373, make contacts 343 and 362, conductor 292, back contacts 225, and the winding of relay 220 to battery. Relay 220 upon operating, at make contacts 221 and 222 prepares circuits to the ringing relays 270 and 280, at make contacts 223 closes another point in the circuit of ring pickup relay 240, at break contacts 224 opens the pulsing circuit, at make contacts 225 locks to hold relay ground on conductor 176, at break contacts 226 opens the original circuit to the ringing machine start conductor 425 now grounded by way of make contacts 11 and conductor 439, and at make contacts 227 grounds the interrupter start conductor 215 from ground at make contacts 12 by way of conductor 419, make contacts 326, and conductor 299.

The ringing interrupter, represented in Figure 4 by the rectangle 28, now starts, and during each ringing cycle connects various combinations of short and long ground pulses corresponding to the different ringing codes, to the coding conductors R1 to R10, through the cable 29. The interrupter also, at the start of each ringing cycle, connects solid negative battery to the locking conductor 428, and a short pulse of negative battery successively to each of the "pick up" conductors PU2 and PU1 shown at the lower center in Figure 3. If the code group relay 335 is operated the battery pulse on the PU2 conductor is effective to select the second ten codes, which differ from the first ten only by the addition of a short ring at the start of each code. If the code group relay 330 is operated however, as in the present case, the pulse on the PU2 pickup conductor is without effect due to open contacts 338, and the battery pulse on the PU1 conductor will be effective to select the first ten codes.

Accordingly, when the first negative pulse on the PU1 conductor occurs, following the operation of transfer relay 220, it causes the operation of pick up relay 240 by way of make contacts 333, conductor 297, back contacts 244, conductor 296, make contacts 325, conductor 295, winding of relay 240, break contacts 212, make contacts 223, conductor 418 to Figure 4, make contacts 13, and conductors 415 and 176 to hold relay ground at make contacts 183. Pick up relay 240 thereupon, at make contacts 241 and 242 further prepares circuits to the ringing relays 270 and 280, and at make-before-break contacts 244 disconnects the pick up conductor and locks itself to battery on conductor 428. Relay 240 further, at make contacts 243 short circuits the upper winding of register release relay 190, in order to make this relay slow to operate. Relay 190 is thus made slow to operate only after the final digit to prevent its premature operation during ringing. With heavily loaded lines, capacitor kicks from the line during ringing may at times tend to operate the back bridge relay 210 momentarily. The register relay 190 would thereupon tend to operate, from make contacts 212, thereby releasing the register and cutting off the ring prematurely. Relay 190 is quick to operate between digits in order to clear the digit register quickly.

Ground pulses corresponding to the first code of the first ten, which is a single long pulse of about two seconds duration, with a silent interval of several seconds, now pass from the ringing interrupter to ringing relay 280, by way of the R1 coding conductor, make contacts 414, conductor 458, make contacts 222 and 242, and back contacts 261. Relay 280 follows these pulses, and on each operation connects a long pulse of ringing current to the positive side of the called line over a circuit which may be traced as follows: "out" terminal of the ringing machine, not shown, which is also connected to negative battery, conductor 255, ring cutoff relay 250, make contacts 281, conductor 287, back contacts 371, make contacts 321, positive talking conductor 156, make contacts 611, 624 and 580 to the positive side of the called line, through the ringers and back over the negative side of the line through make contacts 581, 625 and 612 to the negative talking conductor 164, and through make contacts 322 and 283 to ground. This assumes bridged ringing. With divided ringing, the return would be through ground at the ringers on the positive side of the line and only these ringers would respond.

Ringing relay 280 also at break contacts 281 and 283 "splits" the talking conductors, and at make contacts 282 passes a portion of the ringing current through capacitor 275 and conductor 159 to the repeating coil 135, where it is induced into the calling line as "ring back tone." Relay 280 further, at make contacts 284 closes a circuit to drain relay 230. Relay 230 accordingly follows the pulsations of relay 280 but being slow to release remains operated for a brief interval following each release of relay 280. During this time make contacts 231 and 232 connect ground to the positive talking conductor 156 and negative battery through resistor 235 to the negative talking conductor 164 to drain the condenser charge from the line after each ringing signal.

If the called station answers while ringing current is on the line, a direct current circuit will be established for the slow to operate ring cutoff relay 250 from the superimposed negative battery on conductor 255 and through the answering telephone back to ground. Ring cutoff relay 250 thereupon operates, and closes a circuit to register release relay 190 from hold relay ground on conductors 176 and 415, through make contacts 13, conductor 418, make contacts 251 and conductor 194. Relay 190 thereupon operates over this circuit, and releases the digit register to stop the ringing. As soon as the ringing relay 280 and the drain relay 230 restore, they complete a direct current circuit for the back bridge relay 210 over the called line as follows: ground through the inductance 108, upper right winding of the repeating coil conductor 157, back contacts 231, 271, 281 and 371, make contacts 321, conductor 156 to the called line, through the answering telephone and back to conductor 164, make contacts 322, back contacts 283, 273 and 232, conductor 163, lower right winding of the repeating coil, conductor 162, and the winding of relay 210 to battery. Back bridge relay 210 accordingly operates and at contacts 211 operates battery reversing relay 130 by way of conductor 178 and make contacts 126. Relay 210 at the same time reverses its contacts 212, but this is now without effect, due to removal of ground from conductor 418 and armature spring 212 as a result of the prior release of the register.

If the called station answers during a silent period, while the ringing and drain relays are at normal, the ring cutoff relay is not in circuit, and the back bridge relay operates immediately, from the called line, over the previously traced circuit. Relay 210 thereupon at make contacts 211 again operates battery reversing relay 130 for reversal of battery to the calling line at contacts 131 and 132. Relay 210 also, at back contacts 212 disconnects pick up relay 240 thereby preventing the re-operation of this relay, or causing its release if it is operated. Relay 210 further, at make contacts 212 passes ground from conductor 418 to register release relay 190. Relay 190 thereupon operates as before to release the register, and the release of the register in turn causes the release of relay 190.

The talking circuit between the calling and called lines through the repeating coil is now complete with talking battery being fed to the calling line from line relays 120 and 125, and to the called line from back bridge relay 210 and the inductance coil 108. The talking circuit for the calling line extends through back contacts 100, make contacts 131, through the left side of the repeating coil and the capacitor X, conductor 149, back contacts 382, conductor 148, make contacts 132 and back contacts 112. Similarly the talking circuit for the called line extends through contacts 580, 624 and 611, conductor 156, contacts 321 and 371, conductor 287, contacts 281, 271 and 231, conductor 157, through the right side of the repeating coil and capacitor Y, conductor 163, contacts 232, 273 and 283, conductor 289, contacts 322, conductor 164, and contacts 612, 625 and 581. If the called party hangs up first nothing happens except the release of the back bridge and battery reversing relays 310 and 130, but when the calling party hangs up, line relay 120 restores and releases the connector and the associated linefinder.

Calls to other stations on this or other lines would be made in similar manner, with variations in the call number digits as required. Thus for party lines of ten stations or less, all of the call numbers could start with "2" or "3," but for more than ten stations some of the call numbers would have to start with "2" and some with "3." In case of a first digit "3," register relay 430 operates and at contacts 432 operates code group relay 335 to select the second ten codes. This causes the pickup relay 240 to operate from the pickup pulse on the PU2 conductor following the final digit, thereby selecting the second ten codes with the preliminary short ring. The last digit, which may be anything from "1" to "0," in addition to selecting the code, also selects the side of the line to be rung by determining which of the ring relays 270 or 280 will be employed. Thus, any odd digit will cause relay 280 to be operated, from the code pulses of the selected code, by way of conductor 458, while any even digit will cause relay 270 to be operated, from the ringing interrupter, by way of conductor 455. Relay 270 operates exactly like relay 280 except that it connects ringing current to the negative rather than to the positive side of the called line.

As already indicated the first digit must be a "2" or a "3" for all local calls, and "8," "9" or "0" for a trunk call, in the system illustrated. If any other digit is dialled as a first digit, the release of the dialling transfer relay 370 at the end of the digit will ground the conductors 1 and 2 in the usual way, but this ground instead of passing to a code group relay or a trunk access relay, will pass through one of the pairs of make contacts 412, 442, 452, 462 or 472 to conductors 438 and 194 and the register release relay 190. Relay 190 thereupon operates and releases the register. If the calling party completes the dialling process, the call number will be incomplete, and the connector will not ring. The calling party must then hang up and dial again. If the calling party has noticed the dialling error in time however, or as soon as the first digit has been dialled, he may proceed at once to dial the correct number without hanging up, and the connector will complete the call, just as though the extra digit had not been dialled.

*Connector system-reverting calls*

In the case of a reverting call, where a calling station wishes to call another station on its own line, the dialing of the first three digits of the directory number of the wanted station causes the connector involved to make connection with the calling line, in the same manner as just described in the preceding section. Since this line is now marked busy, busy relay 310 will accordingly operate at the conclusion of the third digit, as soon as the selected units relay operates, from ground on the line's test conductor, through contacts of the operated tens and units relays, conductor 167, back contacts 363, conductor 166, break contacts 115 and conductor 165 to relay 310. The operated units relay at the same time also causes the operation of register relay 190 as before, over conductor 398, through make contacts 356, break contacts 366 and conductor 194. Relays 190 and 310 thereupon, at break contacts 191 and 313 simultaneously open the lockup circuit of the digit register which restores and lets relay 360 operate. Busy relay 310 at the same time, at make contacts 311 passes busy tone from busy tone conductor 368 back to the repeating coil and the calling station by way of conductor 158 and make contacts 181, and at make contacts 312 locks by way of conductor 196 and break contacts 173 to hold relay ground at make contacts 183. Busy relay 310 also at the same time opens break contacts 314 and 316 without effect, at break contacts 315 disconnects switching relay 320, and at make contacts 317 prepares a circuit for the operation of the reverting call relay 170.

The calling party now dials the final digit of the call number and then hangs up. As a result of the final digit, digit transfer relay 220 operates, upon the release of dialling transfer relay 370, to prepare the ringing circuits. Ringing does not take place however at this time, due to the non-operation of switching relay 320, which prevents the operation of the pickup relay 240.

When the calling party hangs up however, after dialling the final digit, the line relays 120 and 125 restore, and relay 120 causes the successive restoration of the pulsing and release relays 140 and 150.

As soon as pulsing relay 140 restores, it immediately completes a lockup circuit for hold relay 180, which may be traced as follows: ground from back contacts 142, break contacts 116, make contacts 185, conductor 169, make contacts 224, conductor 293A, make contacts 315 and 363, test conductor 167 through contacts of the operated tens and units relays, test conductor of the calling line back through the linefinder to test conductor 102, make contacts 182, and the winding of relay 180 to battery. And when release relay 150 restores shortly thereafter, break contacts 154 on this relay extend this same ground to the upper winding of reverting call relay 170, through conductor 197, make contacts 317, and conductor 198.

Reverting call relay 170 operates over this circuit, and at make contacts 171 connects reverting call tone from conductor 155 to the repeating coil 135, by way of capacitor 109 and make contacts 181. Relay 170 also, at make contacts 172 closes alternative circuits to itself and to the hold relay, 180, at break contacts 172 removes ground from the hold conductor 105 to release the linefinder, at break contacts 173, unlocks and releases the busy relay, and at make contacts 174 closes a second locking circuit for itself, to ground on conductor 199, from back contacts 213. The busy relay 310 upon releasing, at make contacts 311 opens the busy tone circuit, at make contacts 317 opens the circuit to the upper winding of the reverting call relay 170, and at back contacts 315 connects up switching relay 320.

Switching relay 320 now operates from grounded conductor 177 to battery on the test conductor of the now idle called line, by way of make contacts 363 and conductor 167, and at make contacts 321 and 322 prepares the ringing and talking circuits. Relay 320 also, at make contacts 325 and 326 prepares the pick up circuit and starts the interrupter, just as for any other call. The pickup relay then operates from one of the pickup conductors, and connects up the ringing relays to start the ringing. During each silent interval, when the ringing and drain relays are normal, reverting call tone passes out to the called line over conductors 164 and 156. This tone is without effect during the ringing, but as soon as the called station answers, it becomes audible in the receiver of the answering telephone, to indicate to the answering party the nature of the call, with a minimum of delay.

If the called station answers during a ringing interval, the ring cutoff relay 250 operates as before to cut off the ring by operating register release relay 190 from make contacts 251, and as soon as the ringing and drain relays restore, back bridge relay 210 operates and disconnects pickup relay 240. If the called station answers during a silent period, back bridge relay 210 operates at once, and cuts off the ring by operating register release relay 190 from make contacts 212, while disconnecting pickup relay 240 at the same time. The back bridge relay does not operate the battery reversing relay 130 however, on a reverting call, since the circuit from make contacts 211 is now open at contacts 126. At contacts 213 however, the back bridge relay opens the original locking circuit of the reverting call relay 170 and substitutes locking ground on conductor 228 from a timer, not shown. This timer, whose form is immaterial, removes the ground on conductor 228 after an interval and releases reverting call relay 170 to cut off the reverting call tone signal. Relay 170 also, at make contacts 172 unlocks and releases hold relay 180, and this relay in turn releases the connector. The called line is now locked out in known manner, and when the calling station comes back in on the line, the connection is complete between calling and called stations, with talking battery fed to both stations from the line relay of the line equipment, not shown.

*Connector system-ground return lines*

Where ground return lines, with a single metallic conductor are employed in this system, the metallic conductor is connected in all cases to the line's negative terminal at the switchboard, and the positive line terminal is grounded.

Upon the extension of a call from a calling one of such lines to a connector such as that of Figures 1 to 6, the connector line relay 125 is shunted and does not operate, but line relay 120 does operate, and seizes the connector in the manner already explained. When dialling begins, relay 125 operates momentarily as usual during each digit in response to the operation of dialling transfer relay 380, but releases again after each digit, when relay 380 opens make contacts 383. When now, the called line answers, in response to the usual ringing signals, the back bridge relay operates, as before, but cannot operate the battery reversing relay 130, due to the open make contacts 126. The connections of the calling line are accordingly not reversed on a call from a ground return line.

In cases where the called line is a ground return line, the operation of the connector is similar to that already described up to the dialling of the final or ringing digit of the call number. Thus, on the first digit, following the release of dialling transfer relay 370 one of the code group relays 330 or 335 operates in the usual way, and on the release of the register relay 350 operates, over its series circuit. On the second digit, following the release of relay 370 one of the tens relays operates, and on the release of the digit register relay 340 operates. Then, upon the dialling of the third digit, one of the units relays operates, following the release of relay 370, and on the release of the digit register, relay 360 operates. This, assuming the called line to be idle, causes the operation of switching relay 320.

Upon the dialling of the fourth digit however, as soon as the dialling transfer relay 370 operates on the first pulse, direct ground on the positive terminal of the called line, causes the operation of the ring reversing relay 260, by way of conductor 156, make contacts 321 and 371, and conductor 294. Relay 260 upon operating, at make contacts 262 locks to hold relay ground on conductors 409 and 168, and at break-make contacts 261 disconnects contacts 242 from the positive ringing relay 280 and connects them to the negative ringing relay 270. In this way, regardless of the value of the final digit, and regardless of whether it is odd or even, ringing relay 270 will be operated from the code pulses on all calls to ground return lines, and direct all ringing signals to the negative or metallic side of the line.

If the connector finds the called line busy on such a call, the busy relay 310 will operate upon the dialling of the third digit, and will prevent the operation of the switching and ring reversing relays. It will also prevent the completion of the ringing circuits, and cause the giving of a busy signal, in the manner previously described.

*Selector system-trunk calls*

To make a call to the first 15-trunk trunk group associated with the tens relays 1430 and 1340 of the selector of Figures 11 to 14, which trunks will likewise be assumed to be trunks to a distant toll operator, a calling station after removing the handset from the telephone, has only to dial the single-digit call number "0."

Upon removal of the handset, a relay type line-finder, not shown, finds the calling line in known manner, and switches it through to an associated selector switch such as that of Figures 11 to 14. The selector line relay 1120 thereupon operates over the following circuit: superimposed ground from the dial tone conductor 1157, through back contacts 1151, upper winding of relay 1120, back contacts 1111, talking conductor 1100 through the finder and the calling telephone, back through the finder again to talking conductor 1101, back contacts 1112 and the lower winding of relay 1120 to battery.

Line relay 1120 upon operating passes ground from back contacts 1113 through make contacts 1121 to the release relay 1130 which also operates. Release relay 1130 thereupon at make contacts 1131 grounds the tone start conductor 1156 to a tone generator not shown, which then connects dial tone to conductor 1157. This dial tone passes through the line relay to the calling line over the circuit previously described, and is made audible at the calling station. Release relay 1130 also, at make contacts 1132 grounds the incoming test conductor 1102 to clear the calling line of attachments, at make contacts 1133 grounds the hold conductor 1103 to lock up the finder, at make contacts 1134 prepares the selector's pulsing circuit, and at break contacts 1135 marks the selector busy at the link allotter, not shown.

The calling subscriber, upon hearing the dial tone, now dials the digit "0." The selector line relay 1120 responds to the dial pulses, and in turn passes ten pulses to the digit register of Figure 12, from ground at back contacts 1113, by way of back contacts 1121, make contacts 1134, break contacts 1152, conductor 1108, and back contacts 62, 52 and 42. Transfer relay 1140 operates in multiple with this circuit, on the first pulse and being slow to release, remains operated during the succeeding pulses. Relay 1140, at contacts 1141 controls a special locking circuit for counting relay 1210, and at contacts 1142 and 1143 controls circuits through the operate springs of the counting relays. Counting relay 1210 operates on the first pulse and on the last half of the pulse locks in series with counting control relay 40 over the following circuit: ground from make contacts 1133 on conductor 1103 left through break contacts 1114 and 1153, conductor 1106, break contacts 53, winding of relay 40, conductor 1107, make contacts 1141, conductor 1123, make contacts 1215, and the winding of relay 1210 to battery. Relay 1220 operates similarly on the second pulse, and locks direct to conductor 1106 through make contacts 1225 and control relay 50, with the latter relay releasing relays 1210 and 40. The other counting relays operate in like manner, until at the end of the tenth pulse, relays 1200 and 40 are locked operated and all of the other register relays are normal.

Shortly after the last pulse, transfer relay 1140 restores, and at break contacts 1142 causes the operation of the trunk access relay 1510 associated with this selector, over the following circuit: ground from make contacts 1133, break contacts 1114 and 1142, conductor 1122, make contacts 41 and 1203, conductor 1299 through cable 1529, winding of relay 1510, break contacts 1513 and 1552, make contacts 1571, break contacts 1534 and 1514 and similar contacts on the intervening access relays of his group, not shown, and through break contacts 1561 and the associated resistor 1574 to battery.

Access relay 1510 upon operating over this circuit, at its lower make contacts extends the units control conductors and the busy conductor to all of the various groups of trunk group relays, extends the tens control conductor for the selector T10 relay 1430 to the trunk group relays associated with the first large trunk group "L," extends the tens control conductor for the T20 tens relay 1350 to the trunk group relays associated with the second large trunk group "M," and extends the tens control conductor for the T10—20 relay 1340 to both of the foregoing groups of trunk group relays. Access relay 1510 also, at preliminary make contacts 1512 locks operated independently of contacts 1513, at break contacts 1513 and 1514 opens its own operate circuit and that of the other access relays in the same group, and at make contacts 1515 operates lockout relay 1550 momentarily. Relay 1550 in turn, at contacts 1551 opens the circuit of the slow releasing kickoff relay 1570 and operates lockout relay 1560, at contacts 1552 opens a common point in the access relay operate circuits, and at make contacts 1553 shunts break contacts 1561. Access relay 1510 further, at make contacts 1511 operates trunk group relay 1610 over the following circuit: ground through contacts 1511, conductor 1189 through cable 1529, break contacts 1143, conductor 1289, make contacts 1201, conductor 1297 through cable 1529, winding of relay 1610, break contacts 1613 and 1652, break contacts 1633 and 1612 and similar contacts on the intervening group relays, not shown, and break contacts 1661 and the associated resistor 1663 to battery.

Trunk group relays 1610 upon operating, at preliminary make contacts 1611 locks to battery through resistor 1663 independently of contacts 1612, at break contacts 1612 opens its own operate circuit, at break contacts 1613 opens the operate circuit of all of the trunk group relays in the group, and at make contacts 1614 operates lockout relay 1650. Relay 1650 thereupon, at make contacts 1662 closes a peg count meter circuit, and at break contacts 1661 opens a branch of the circuit through resistor 1663. Group relay 1610 further at make contacts 1615 to 1624 extends the kickoff conductor, the units control conductors, the busy conductor, and the T10 and T10—20 tens control conductors to the trunk select relays of Figures 17 and 18.

Immediately upon the extension of the tens and units control conductors to Figures 17 and 18 as indicated, and assuming all of the trunks of the associated large trunk group to be idle and preselect relay 1720 operated as shown on the drawing, ground from make contacts 1726 and 1722 on this relay will be passed back to tens relay 1430 and units relay 1410 to cause the substantially simultaneous operation of these relays. The circuit for the T10 tens relay 1430 is from ground at contacts 1726, through conductor 1697, make contacts 1623, conductor 1587, make contacts 1523, conductor 1507 through cable 1529, and the winding of relay 1430 to battery. The circuit for the 1–6 units relay 1410 is from ground at contacts 1722, by way of conductor 1691, make contacts 1617, conductor 1581, make contacts 1517, conductor 1501 through cable 1529, and the winding of relay 1410 to battery.

The tens relay 1430 upon operating, at its lower make contacts, prepares circuits to the first ten trunks of the "L" trunk group, and at make contacts 1431 locks by way of resistor 1402 and conductor 1103, to ground at make contacts 1133. The units relay 1410 upon operating, at its upper make contacts prepares circuits to the 1st and 6th trunks, and at make contacts 1418 locks by way of resistor 1401 and conductor 1103 to ground at make contacts 1133. Relay 1410 further, at make contacts 1417 closes a circuit to switch-through relay 1110 as follows: ground through make contacts 1132, conductors 1102 and 1186, contacts 1417, conductor 1187, contacts 1155, break contacts 1117 and resistor 1118 in parallel, and the winding of relay 1110 to battery.

Switch-through relay 1110 operates over this circuit, and at make contacts 1111 and 1112 switches the calling line through to the first trunk 1L of the called trunk group, by way of back contacts 1171 and 1172, conductors 1180 and 1182, make contacts 1411 and 1412, and make contacts 1432 and 1433. The trunk repeater, not shown, thereupon returns ground over its test conductor to test conductor 1102 by way of make contacts 1434 and 1413, and back contacts 1173, preparatory to the release of relay 1130. The switching-through relay 1110 also, at break contacts 1111 and 1112 disconnects line relay 1120, at break contacts 1113 removes ground from the pulsing circuit, at make contacts 1113 grounds hold conductor 1103 preparatory to the release of relay 1130, at break contacts 1114 unlocks and releases the digit register and at break contacts 1115 opens another point in the selector busying circuit in anticipation of the re-closure of break contacts 1135. Relay 1110 further, at break contacts 1116 disconnects the busy relay 1150 and at break contacts 1117 cuts resistor 1118 into its own circuit, to cut down the current consumption.

The selector line relay 1120 restores, as soon as it is disconnected from the calling line, and shortly thereafter, release relay 1130 also restores. The opening of break contacts 1114 and the release of the digit register at the same time causes the release of the operated trunk access and trunk group relays 1510 and 1610. The release of relays 1510 and 1610 causes the successive release of the lockout relays 1550 and 1560, and of the lockout relays 1650 and 1660, and on the final release of relays 1560 and 1660 the access and group relays are ready for the next call.

The seizure of the trunk, in addition to grounding the test conductor to hold the connection, also opens the circuit to the trunk busy relay 1710, which then releases to cause the operation of the next preselect relay and the release of preselect relay 1720, in the same manner as described for the connector system, with subsequent calls directed to the succeeding trunks of the group in rotation in accordance with the setting of the preselect relays.

Thus on the 6th to 10th calls, the units switching relay 1170 also operates from contacts such as 1761 and 1781 on the operated preselect relay by way of conductor 1690, contacts such as 1616 and 1516, and conductor 1500, to direct the calls to the trunks 6L to 10L as required. And on the 11th call to this trunk group, the operated preselect relay 1820 causes the operation of the T10—20 tens relay 1340, the 1–6 units relay 1410 and the units switching relay 1170, from contacts 1826, 1822 and 1821, to direct the call to the trunk 11L. The 12th to 15th calls operate the tens relay 1340, the units switching relay 1170, and the proper units relay in like manner, to direct the calls to the trunks 12L to 15L as required, and when the last trunk is taken into use, the preselect chain is reset by the operation of reset relay 1890, in the manner previously described. If no idle trunks are available at this time, relay 1890 remains operated and causes the restoration of the slow to release all trunks busy relay 1895.

If a call is attempted to this trunk group while all of the trunks are busy, the extension of the tens and units control conductors to the trunk select relays is without effect, since no preselect relay is operated, and the tens and units relays of the calling selector remain normal. The selector busy relay 1150 will be operated however, from all trunks busy relay 1895 over the following circuit: ground through break contacts 1897, conductor 1696, contacts such as 1622 and 1522, conductor 1506, break contacts 1116, and the winding of relay 1150 to battery. Busy relay 1150 thereupon, at break contacts 1155 disconnects the switch-through relay 1110, at make contacts 1154 locks by way of break contacts 1114 to ground on the hold conductor 1103, at break contacts 1153 unlocks and releases the digit register, at break contacts 1152 disconnects the pulsing circuit, and at contacts 1151 connects busy tone from conductor 1158 to the calling line through the line relay 1120, and disconnects dial tone. The operated trunk access and trunk group relays restore, upon the release of the digit register.

In the case of a blocked call, where the switch-through relay fails to operate promptly, although idle trunks are available, the digit register and the operated trunk access and trunk group relays will not restore. The kickoff relay 1570 will accordingly release, after a short delay, following the opening of break contacts 1551. Relay 1570 thereupon at make contacts 1571 opens another common point in the access relay operate circuit, at break contacts 1572 grounds the kickoff conductor 1579 to advance the trunk select relays, and at break contacts 1573 grounds the busy conductor 1586 to operate the busy relay 1150 in the selector. Busy relay 1150 thereupon releases the digit register and the operated trunk access and trunk group relays as before, and gives the busy signal to the calling line. The calling party, on hearing the busy signal, will hang up and try again, whereupon the call will be directed to the next idle trunk.

In the case of a call to this trunk group from another selector in the first group of selectors, the action is similar to the foregoing, except for the operation of a different trunk access relay. A call from the last selector 1545 for example, will operate access relay 1530, and a call from other selectors of this group will operate other access relays, not shown.

In the case of a call to this trunk group from a different selector group, the action is also similar, except for the use of a different group of trunk access relays, and the operation of a different trunk group relay, in Figure 16. A call from a selector such as 1555 or 1565 in the last group of selectors for example, will operate a corresponding access relay in the associated group of trunk access relays 1575, and this relay in turn will cause the operation of trunk group relay 1630. Otherwise the operation is identical with that already described.

*Selector system-local calls*

Local calls are extended through the selector, in response to the first digit of the call number, to an idle connector or selector, dependent on the size of the system, in the same manner as just described. Assuming for example that the system being considered is a 1000 line system, and that the second large trunk group gives access to a group of 15 connectors, not shown, any call number beginning with the digit "9" will direct the call to this group of connectors, by way of either of the tens relays 1350 or 1340.

Upon the dialling of the first digit "9" of the call number, the selector line relay 1120 passes nine ground pulses to the digit register, by way of contacts 1134 and 1152, and conductor 1108. The digit register thereupon counts off nine steps in the usual way, leaving relays 1290 and 60 locked operated in series, from the ground on conductor 1106 from make contacts 1133. Transfer relay 1140 operates on the first pulse in multiple with the pulsing circuit, and releases shortly after the last pulse as before. Upon the release of transfer relay 1140, it extends the ground from make contacts 1133 to the trunk access relay such as 1510, corresponding to the calling selector, by way of break contacts 1142, conductor 1122, make contacts 61 and 1293, and conductor 1299.

Access relay 1510 thereupon operates as before, locks out the other access relays, and extends the various tens and units and miscellaneous control conductors to the various groups of trunk group relays in the manner previously outlined. Relay 1510 at the same time causes the operation of a group relay corresponding to relay 1610, in the trunk group relays 1605 over the following circuit: ground through make contacts 1511, conductor 1189 through cable 1529, break contacts 1143, conductor 1289, make contacts 1291, and conductor 1296 through cable 1529 to the stated group relay, not shown, in the rectangle 1605.

The stated trunk group relay upon operating over this circuit, locks out the other group relays, and extends the peg count, kick off, and busy conductors, the units control conductors, and the T20 and T10–20 tens control conductors to the trunk select relays 1675. If the first connector in the "M" group is idle at this time, and the first preselect relay is operated, as in Figure 17, the trunk select relays 1675 will thereupon operate the selector T20 tens relay 1350 and the 1–6 units relay 1410, by way of the cables 1626 and 1556, conductors 1590 and 1581, make contacts 1525 and 1517, and conductors 1509 and 1501. The tens and units relays 1350 and 1410 thereupon lock to the grounded hold conductor 1103 and units relay 1410 operates switch-through relay 1110 by way of make contacts 1417 and conductor 1187, as before.

Switch through relay 1110 upon operating, again releases the digit register, and the trunk selecting equipment, and switches the call through to the connector 1M, over back contacts 1171 and 1172, make contacts 1411 and 1412, and make contacts 1352 and 1353. The connector 1M thereupon passes back test conductor ground through make contacts 1354, and releases the corresponding trunk busy relay in the trunk select relays 1675 to preselect the next idle connector. The connector 1M then responds to the remaining digits of the call number to select and ring the called station.

Further calls beginning with the digit "9" are directed similarly to the other connectors of the group M in turn. Thus, assuming all of the other connectors to be idle, the second call will be directed to the 2nd connector, the third call to the 3rd connector and so on, with the units switching relay 1170 operating on the 6th to 10th calls. On the 11th to 15th calls, the T10–20 tens relay 1340 operates and the units switching relay 1170 remains normal, in order to direct the calls to the last five connectors of the M group, which are indicated as being connected to the first five sets of contacts on tens relay 1340.

Local calls beginning with the digit "8" will be directed through the T30 tens relay 1360 to the N group of connectors, which as previously indicated, is a small group of ten, all connected to the contacts of this relay. Upon the dialling of a first digit "8" therefore, the selector line relay 1120 passes eight pulses to the digit register, leaving relays 1280 and 50 operated. Transfer relay 1140 operates as usual on the first pulse, and releases shortly after the last pulse. When relay 1140 restores, it causes the simultaneous operation of tens relay 1360 and of the trunk access relay such as relay 1510 associated with this selector. The circuit for tens relay 1360 is from ground through make contacts 1133, break contacts 1114 and 1142, conductor 1122, make contacts 51 and 1282, and conductor 1298. The circuit for access relay 1510 is in multiple with the foregoing, branching at make contacts 1283 to conductor 1299 leading to relay 1510.

The T30 tens relay 1360 upon operating locks through make contacts 1361, conductor 1409 and resistor 1402 to the hold conductor 1103 in obvious manner, while the access relay 1510 extends the various tens and units and miscellaneous control conductors to the various trunk group relay units as before. Access relay 1510 at the same time, causes the operation of a group relay corresponding to relay 1610, in the trunk group relays 1655 over the following circuit: ground through make contacts 1511, conductor 1189 through cable 1529, break contacts 1143, conductor 1289, make contacts 1281, and conductor 1288 through cable 1529 to the stated group relay, not shown, in the rectangle 1655.

The stated trunk group relay upon operating, extends the units control conductors and the peg count, kick off, and busy conductors to the trunk select relays, not shown, in the rectangle 1665. If the first connector of the "N" group is idle, and the first preselect relay operated, as in Figure 17, the trunk select relays will thereupon cause the operation of the selector 1–6 units relay 1410 by way of the cables 1636 and 1546, conductor 1581, make contacts 1517 and conductor 1501. Tens relay 1360 having been operated already, by the counting relays, is not effected.

The 1–6 units relay 1410 upon operating, at make contacts 1418 locks as usual through resistor 1401 to the grounded hold conductor 1103, and at make contacts 1417 passes ground from test conductor 1102 to conductor 1187 and thence to switch-through relay 1110. Relay 1110 now operates as before, and releases the digit register and the trunk selecting equipment. Relay 1110 at the same time connects its own ground to the hold conductor 1103 as before, disconnects and releases line relay 1120 and extends the call to the 1N connector, not shown, by way of back contacts 1171 and 1172, make contacts 1411 and 1412, and make contacts 1362 and 1363. The connector 1N upon being seized, passes back ground to test conductor 1102 through make contacts 1364 and 1413 and back contacts 1173. The connector 1N then responds to the remaining digits of the call number to complete the connection in known manner. Further calls beginning with the digit "8" are directed in like manner to the other connectors of the N group in turn as available, and when the 10th connector is taken into use, the select relays 1665 are reset to start the preselect cycle over again, in the regular way.

In practice, of course, all of the selector tens relays may be operated from the trunk select relays, in the same manner as described for calls to the large trunk groups. In the present case however, the selector tens relays associated with the small trunk groups, have been assumed to be operated direct from the counting relays, to better show the high degree of flexibility inherent in the arrangement.

*Selector system-digit absorption*

The carrying of the locking circuit of the first counting relay through make contacts on the selector transfer relay is for the purpose of nullifying or absorbing a first digit "1," which is often not employed, due to the risk of an accidental preliminary impulse from the switch hook or other source. This of course, reduces the capacity of the selector somewhat, and if this extra capacity is needed, the special locking circuit for relay 1210 may be shorted out, or left out, and the final tens relay added.

As the circuit is shown, however, a single impulse on the line, following the seizure of the selector, and the resultant single release and re-operation of the line relay 1120 will pass a single ground impulse to transfer relay 1140 and the digit register. Thus on the release of relay 1120, transfer relay 1140 and counting relay 1210 operate in parallel in the manner previously described, from ground at back contacts 1113, through back contacts 1121 and 1152, conductor 1108, and back contacts 62, 52 and 42. Transfer relay 1140, at make contacts 1141 closes a point in the locking circuit of counting relay 1210, and at break contacts 1142 and 1143 disables the operate springs of all the counting relays momentarily. Counting relay 1210, at make contacts 1214 prepares the operate circuit of the second counting relay and at make contacts 1215 closes a second point in its locking circuit, in series with counting control relay 40, which now has ground on both sides of its winding.

Upon the re-energization of line relay 1120, back contacts 1121 again open the circuit to the relays 1140 and 1210. This removes the shunt from counting control relay 40 and this relay thereupon operates and locks up relay 1210 over the following circuit: ground from make contacts 1133, through break contacts 1114 and 1153, conductor 1106, break contacts 53, winding of relay 40, conductor 1107, make contacts 1141, conductor 1123, make contacts 1215, and the winding of relay 1210 to battery. As soon as transfer relay 1140 releases however, as a result of the re-operation of relay 1120, it opens this locking circuit, and relays 40 and 1120 restore. The impulse has thus been without practical effect and the selector is back in its original position of seizure, just as if it had not occurred.

What is claimed is:

1. In a telephone system, a relay type switch, a first, a second and a third tens relay in said switch, a first group of trunks accessible to said first and second tens relays, a second group of trunks accessible to said third and second tens relays, other tens relays in said switch, other groups of trunks accessible to said other tens relays, trunk preselecting equipment external to said switch for controlling the extension of a call from said switch to a preselected idle trunk in any called one of said trunk groups, an individual conductor connected to each of said tens relays over which said relays are operated to prepare the connection to the preselected trunk in the called trunk group, the conductors individual to said first, second and third tens relays extending to said trunk preselecting equipment and controlled from within said equipment, and the conductors individual to said other tens relays confined wholly within said switch and controlled from within said switch.

2. In a telephone system, a relay type switch, a tens relay in said switch, a first and a second group of trunks accessible to said relay, a first trunk preselecting unit individual to said first group of trunks for controlling the extension of a call from said switch to an idle trunk in said first trunk group, a second trunk preselecting unit individual to said second group of trunks for controlling the extension of a call from said switch to an idle trunk in said second trunk group, a conductor connected to said tens relay over which said relay is operated, means for extending said conductor to said first preselecting unit for operating said tens relay therefrom when said first trunk group is called, and means for extending said conductor to said second preselect unit for operating said tens relay therefrom when said second trunk group is called.

3. In a telephone system, a relay type switch, a first, a second, and a third tens relay in said switch, a first group of trunks accessible to said first and second relays, a second group of trunks accessible to said third and second relays, a first and a second single-digit call number corresponding respectively to said trunk groups, trunk preselecting equipment external to said switch, means responsive to the dialling of said first call number to said switch for operating either of said first and second relays from said preselecting equipment to extend a call to an idle trunk in said first trunk group, and means responsive to the dialling of said second call number to said switch for operating either of said third and second relays from said preselecting equipment to extend a call to an idle trunk in said second trunk group.

4. In a telephone system, a relay type switch having units relays and a first, a second, and a third tens relay therein, contacts on said relays, a first group of trunks exceeding ten connected individually to the contacts of said first tens relay and to some of the contacts of said second tens relay, a second group of trunks exceeding ten connected individually to the contacts of said third tens relay and to others of the contacts of said second tens relay, a first and a second single-digit call number, trunk preselecting equipment, means responsive to the dialling of said first call number to said switch for seizing said preselecting equipment and causing the operation therefrom of one of said units relays and either of said first and second tens relays to extend a call through the contacts of such operated relays to a preselected idle trunk in said first trunk group, and means responsive to the dialling of said second call number to said switch for seizing said preselecting equipment and causing the operation therefrom of one of said units relays and either of said third and second tens relays to extend a call through the contacts of such operated relays to a preselected idle trunk in said second trunk group.

5. In a telephone system, a plurality of relay type switches, a first, a second and a third tens relay in each said switch, a first group of trunks exceeding ten accessible to said first and second relays, a second group of trunks exceeding ten accessible to said third and second relays, a first and a second single-digit call number corresponding respectively to said trunk groups, trunk selecting equipment common to said switches, means for setting said equipment automatically to predetermine the selection of the next idle trunk in each said trunk group, means responsive to the dialling of said first call number to any of said switches for seizing said equipment and for causing the operation therefrom of either of said first and second relays in such switch in accordance with the setting of said equipment to extend a connection to an idle trunk in said first trunk group, and means responsive to the dialling of said second call number to any of said switches for seizing said equipment and for causing the operation therefrom of either of said third and second relays in such switch in accordance with the setting of said equipment to extend a connection to an idle trunk in said second trunk group.

6. In a telephone system, a plurality of relay type switches each having units relays and a first, a second and a third tens relay therein, contacts on said relays, a first group of trunks exceeding ten connected to the contacts of said first tens relays and to some of the contacts of the second tens relays, a second group of trunks connected to the contacts of said third tens relays and to others of the contacts of said second tens relays, control conductors and a digit register for each said switch, trunk selecting equipment for said switches including a group of trunk access relays and a first and a second group select relay and a first and a second group of trunk select relays, a first and a second single-digit call number, means responsive to the dialling of said first call number to any one of said switches for causing the operation of one of said access relays from the digit register thereof and for causing the operation of said first group select relay from said operated access relay and said digit register, means responsive to the operation of said access and group select relays for operating any of said units relays and either of said first and second tens relays in said one switch from said first group of trunk select relays over the control conductors of said one switch to extend a connection through the contacts of such operated tens and units relays to an idle trunk in said first trunk group, means responsive to the dialling of said second call number to any one of said switches for causing the operation of one of said access relays from the digit register thereof and for causing the operation of said second group select relay from said operated access relay and said digit register, and means responsive to the operation of said access and group select relays for operating any of said units relays and either of said third and second tens relays in said one switch from said second group of trunk select relays over the control conductors of said one switch to extend a connection through the contacts of said operated tens and units relays to an idle trunk in said second trunk group.

7. In a telephone system, a relay type switch having a plurality of single-group tens relays, a plural-group tens relay and a plurality of units relays therein, contact sets on said relays, a plurality of trunk groups each exceeding ten trunks, the trunks of each said trunk group connected individually and separately to the contact sets of one of said single group relays and at least one of the contact sets of said plural-group relay, a different single-digit call number for each said trunk group, trunk selecting equipment external to said switch for operating said tens and units relays to extend a connection through the contacts thereof to a predetermined idle trunk in any called one of said trunk groups, and means in said trunk selecting equipment operated in response to the dialling of any of said call numbers to said switch for causing the operation of one of said single-group relays in case the predetermined idle trunk in the called trunk group is connected to the contacts of such single-group relay, and for causing the operation of said plural-group relay in case the predetermined idle trunk in the called trunk group is connected to the contacts of such plural group relay.

8. In a telephone system, a relay type switch having a plurality of single-group tens relays, a plurality of plural-group tens relays and a plurality of units relays therein, contact sets on said relays, a plurality of trunk groups each exceeding ten trunks accessible to said switch, the trunks of each said trunk group being connected individually to the contact sets of a corresponding one of said single-group relays and to at least one of the contact sets of one or more of said plural-group relays, a separate single-digit call number for each of said trunk groups, trunk selecting equipment associated with said switch and normally disconnected therefrom for predetermining the selection of the next idle trunk in each trunk group and for operating said tens and units relays to extend a connection through the contact sets thereof to such predetermined idle trunk in any called one of said trunk groups, and means in said trunk selecting equipment operated in response to the dialling of any of said call numbers to said switch for causing the operation of the corresponding single-group relay in case the predetermined idle trunk in the called group is connected to the contacts of such relay, and for causing the operation of one of said plural-group relays in case such predetermined idle trunk is connected to the contacts of such relay.

9. In a telephone system, subscriber lines including some two-conductor lines, a relay type switch for extending calls from said subscriber lines in response to dialled digits, two line relays for said switch operable in series over the two conductors of a calling one of said two-conductor lines in response to the extension of a call therefrom to said switch, and means in said switch for disconnecting one of said relays from such line and establishing a local holding circuit for said one relay in response to the first pulse of each dialled digit and for reconnecting said one relay to such line and disconnecting said local holding circuit in response to the termination of each dialled digit.

10. In a telephone system, subscriber lines including two-conductor lines, a relay type switch for extending calls in response to dialled digits, a source of potential for said switch having a grounded and an ungrounded terminal, a first and a second line relay for said switch connected respectively to said grounded and ungrounded terminals and operable in series over any of said two-conductor lines in response to the extension of a call therefrom to said switch, impulse responsive means in said switch for disconnecting said first line relay from such line and connecting said grounded terminal direct to such line in its place for controlling said second line relay, at the start of each dialled digit, and for reconnecting said first relay and removing said direct ground connection at the end of each dialled digit, and means for maintaining said first relay operated while so disconnected from such calling line.

JOHN H. VOSS.

REFERENCES CITED

The following references are of record in the file of this patent:

UNITED STATES PATENTS

| Number | Name | Date |
|---|---|---|
| 1,923,060 | Appelius | Aug. 22, 1933 |
| 2,279,531 | Saunders | Apr. 14, 1942 |
| 2,315,378 | Powell | Mar. 30, 1943 |
| 2,443,945 | Bellamy | June 22, 1948 |